(12) United States Patent
Okabe et al.

(10) Patent No.: US 7,273,441 B2
(45) Date of Patent: Sep. 25, 2007

(54) WORK VEHICLE HAVING A SPEED CHANGE ARRANGEMENT

(75) Inventors: Nobuyuki Okabe, Izumi (JP); Kenji Yoshikawa, Osaka (JP)

(73) Assignee: Kubota Corporation, Osaka (JP)

( * ) Notice: Subject to any disclaimer, the term of this patent is extended or adjusted under 35 U.S.C. 154(b) by 277 days.

(21) Appl. No.: 11/054,354

(22) Filed: Feb. 9, 2005

(65) Prior Publication Data

US 2005/0221953 A1    Oct. 6, 2005

(30) Foreign Application Priority Data

Feb. 12, 2004  (JP)  .............................. 2004-035513
Jan. 24, 2005  (JP)  .............................. 2005-015442

(51) Int. Cl.
*F16H 59/48*    (2006.01)
*B60W 10/04*    (2006.01)

(52) U.S. Cl. ........................................ 477/120; 477/115
(58) Field of Classification Search ................ 477/115, 477/120, 902, 904, 905; 701/55, 56
See application file for complete search history.

(56) References Cited

U.S. PATENT DOCUMENTS 4,740,898 A    4/1988  McKee et al.

(Continued)

FOREIGN PATENT DOCUMENTS

DE    2336772    1/1974

(Continued)

OTHER PUBLICATIONS

English translation of DE3806194, translated by www.worldlingo.com on May 2, 2007.*

(Continued)

*Primary Examiner*—Roger Pang
(74) *Attorney, Agent, or Firm*—The Webb Law Firm

(57) ABSTRACT

A work vehicle, in accordance with the present invention, having a speed change arrangement comprising: front wheels and rear wheels; an engine supported by the front wheels and rear wheels; power train extending between the engine and at least the rear wheels, the power train transmitting power at least to the rear wheels; a speed change device provided to the power train; an accelerator operating member for controlling the accelerator for the engine; rotational speed sensor that detects an actual rotational speed of the engine; a controller signally connected to the rotational speed sensor, the controller shifting the speed change device to a higher speed position if a difference between a set rotational speed of the engine set by the accelerator operating member and the actual engine rotational speed is less than a first set value, and the controller shifting the speed change device to a lower speed position if the difference between the set rotational speed of the engine set by the accelerator operating member and the actual engine rotational speed is greater than a second set value which is greater than the first set value; at least one manual adjusting member for manually changing the first and second values.

17 Claims, 14 Drawing Sheets

U.S. PATENT DOCUMENTS

| | | | |
|---|---|---|---|
| 5,109,730 A | | 5/1992 | Zahn et al. |
| 5,487,004 A | * | 1/1996 | Amsallen ..................... 701/51 |
| 5,873,427 A | | 2/1999 | Ferguson et al. |
| 6,887,182 B2 | * | 5/2005 | Nakatani et al. ............ 477/120 |
| 7,010,406 B2 | * | 3/2006 | Sah et al. ..................... 701/55 |
| 2003/0010025 A1 | * | 1/2003 | Evans ......................... 60/431 |
| 2004/0248697 A1 | * | 12/2004 | Dobele ...................... 477/115 |

FOREIGN PATENT DOCUMENTS

| | | |
|---|---|---|
| DE | 3806194 | 8/1989 |
| EP | 1275887 | 1/2003 |
| JP | 51-14654 | 5/1976 |
| JP | 3-163263 | 7/1991 |
| JP | 10-248308 | 9/1998 |

OTHER PUBLICATIONS

English translation of DE2336772, translated by www.worldlingo.com on May 2, 2007.*

* cited by examiner

WORK VEHICLE HAVING A SPEED CHANGE ARRANGEMENT

BACKGROUND OF THE INVENTION

The present invention is directed to a work vehicle with a speed change arrangement such as an agricultural or construction vehicle.

FIGS. 1, 2, and 3 of the Publication of Japanese Patent Application No. H3-163263 discloses a work vehicle equipped with a rotational speed sensor for the engine with which a standard rotational speed is set when the engine is under no load. The speed change device is automatically shifted to either a higher speed position or a lower speed position depending on the actual engine rotational speed and the standard rotational speed.

The speed change device of the vehicle is automatically shifted to a higher speed position when it is decided that the load on the engine is small when the difference between a set rotational engine speed set by an accelerator control member (such as a manually operated accelerator lever or an accelerator pedal) and the actual engine rotational speed is small. The speed change device is automatically shifted to a lower speed position when it is decided that the load on the engine is large when the difference between a set rotational engine speed and the actual engine rotational speed is large.

Also, there are work vehicles where their speed change devices are automatically shifted either to a higher speed position or a lower speed position based on the amount of load on the engine. For example, in the work vehicle disclosed in the above mentioned publication, the speed change device is shifted to a lower speed position when the engine rotational speed decreases to a lower threshold and stays below the threshold for a predetermined length of time to avoid an excess engine load.

To address a problem of frequently changing engine rotational speed, the publication of Japanese patent application NO. H10-248308 also discloses a vehicle where the speed change device is shifted to a lower speed position not immediately after the actual engine rotational speed reaches a lower threshold but only after the rotational speed stays below the threshold for a predetermined length of time so that the speed change device would not be shifted to a lower speed position too frequently.

Work vehicles run under different running conditions including a work run where the vehicle runs substantially at a constant speed (so that the accelerator is not operated very frequently) with an implement in operation, and a on-road traveling condition where the accelerator may be operated more frequently. Therefore, improvements can be made in the area of automatically shifting the change speed device to address the diverse conditions that work vehicles experience.

SUMMARY OF THE INVENTION

One object of the invention is to improve automatic shifting of the change speed device to address the diverse conditions that work vehicles experience.

Another object of the invention is to provide a vehicle with automatic shifting of the speed change device that is appropriately shifted either to a higher speed position or to a lower speed position.

To achieve the object of the invention, a work vehicle, in accordance with the present invention, having a speed change arrangement comprises: ground contact means; an engine supported by the ground contact means; power train provided between the engine and the ground contact means, the power train transmitting power to the ground contact means; a speed change device provided to the power train; an accelerator operating member for controlling the accelerator for the engine; rotational speed sensing means that senses an actual rotational speed of the engine; automatic speed change means for shifting the speed change device to a higher speed position if a difference between a set rotational speed of the engine set by the accelerator operating member and the actual engine rotational speed is less than a first set value, and for shifting the speed change device to a lower speed position if the difference between the set rotational speed of the engine set by the accelerator operating member and the actual engine rotational speed is greater than a second set value which is greater than the first set value; adjusting means for changing the first and second set values.

Accordingly, when the difference between the set rotational speed of the engine set by an accelerator operating member and the actual engine rotational speed is small (i.e. smaller than the first set value), the load on the engine is determined to be small and the change speed device is shifted to a higher speed position. On the contrary, when the difference between the set rotational speed of the engine and the actual engine rotational speed is large (i.e. greater than the second set value), the load on the engine is determined to be large and the change speed device is shifted to a lower speed position.

The speed change arrangement of the present invention provides adjusting means for changing the first and second set values which can be used to adjust these values depending on a different running condition.

For example, when the first set value is adjusted to a higher value, even a small difference in the set engine rotational speed and the actual engine rotational speed would fall below the first set value, which causes the speed change device to be shifted to a higher position. That is, by making this adjustment, the speed change device tends to be shifted to a higher speed position. On the other hand, if the first set value is adjusted to a lower value, the difference in the set engine rotational speed and the actual engine rotational speed would need to be small enough to fall below the first set value to cause the speed change device to be shifted to a higher position, making it more difficult for the speed change device to be shifted to a higher speed position.

When the second set value is adjusted to a lower value, a slightly large difference in the set engine rotational speed and the actual engine rotational speed would reach the second set value, which causes the speed change device to be shifted to a lower speed position. That is, by making this adjustment, the speed change device tends to be shifted to a lower speed position. On the other hand, if the second set value is adjusted to a higher value, the difference in the set engine rotational speed and the actual engine rotational speed would need to be large enough to exceed the second set value to cause the speed change device to be shifted to a lower speed position, making it more difficult for the speed change device to be shifted to a lower speed position.

Therefore, the speed change device is appropriately shifted automatically in various different running conditions which leads to an overall improvement in speed change operation.

To achieve another object of the invention, a work vehicle, in accordance with the present invention, having a speed change arrangement comprises: ground contact means; an engine supported by the ground contact means; power train provided between the engine and the ground contact means, the power train transmitting power to the ground contact means; a speed change device provided to the power train; change rate sensing means that senses a change rate of the actual rotational speed of the engine; automatic speed lowering means for shifting the speed change device to a lower speed position if the change rate approaches a predetermined change rate and remains at a value close to the predetermined change rate for a predetermined amount of time when the actual engine rotational speed decreases; changing means for delaying or expediting the timing for shifting the speed change device to a lower position by the automatic speed lowering means depending on the difference between the actual change rate and the predetermined change rate while the actual change rate is at a value close to the predetermined change rate when the actual engine rotational speed decreases.

Accordingly, a sudden increase in the engine load can be detected by detecting the change rate of the actual engine speed so that the change speed device is shifted to a lower speed position without delay thus avoiding an sudden excess load on the engine.

The speed change device is shifted to a lower speed position not immediately after the actual engine rotational speed approaches a lower threshold but only after the rotational speed remains at a value close to the threshold for a predetermined length of time so that the speed change device would not be shifted to a lower speed position too frequently.

Further, when the actual engine rotational speed decreases to a value close to a predetermined change rate, the timing for the speed change device to be shifted to a lower speed position by the automatic speed lowering means is set appropriately depending on the change rate. This reduces the incidents of shocks experienced when lowering a speed position, which results in improved riding condition.

To achieve another object of the invention, a work vehicle, in accordance with the present invention, having a speed change arrangement comprises: ground contact means; an engine supported by the ground contact means; power train provided between the engine and the ground contact means, the power train transmitting power to the ground contact means; a speed change device provided to the power train; rotational speed sensing means that senses an actual rotational speed of the engine; automatic speed increasing means for shifting the speed change device to a higher speed position if the actual rotational speed of the engine increases to approach a predetermined rotational speed and remains at a value close to the predetermined rotational speed for a predetermined amount of time; changing means for delaying or expediting the timing for shifting the speed change device to a higher speed position by the automatic speed increasing means depending on the difference between the actual engine rotational speed and the predetermined rotational speed when the actual engine rotations speed increases to a value close to the predetermined rotational speed.

Therefore, when the actual engine rotational speed increases to a value close to a predetermined rotational rate, the timing for the speed change device to be shifted to a higher speed position by the automatic speed increasing means is set appropriately depending on the difference between the set engine rotational speed and the actual engine rotational speed. This reduces the frequent shifting of the speed change device to a higher speed position, and also reduces the incidents of shocks experienced when raising a speed position, which results in improved riding condition.

DETAILED DESCRIPTION OF PREFERRED EMBODIMENTS

Preferred embodiments in accordance with the present invention are described next with reference to the attached drawings.

Figure 1:
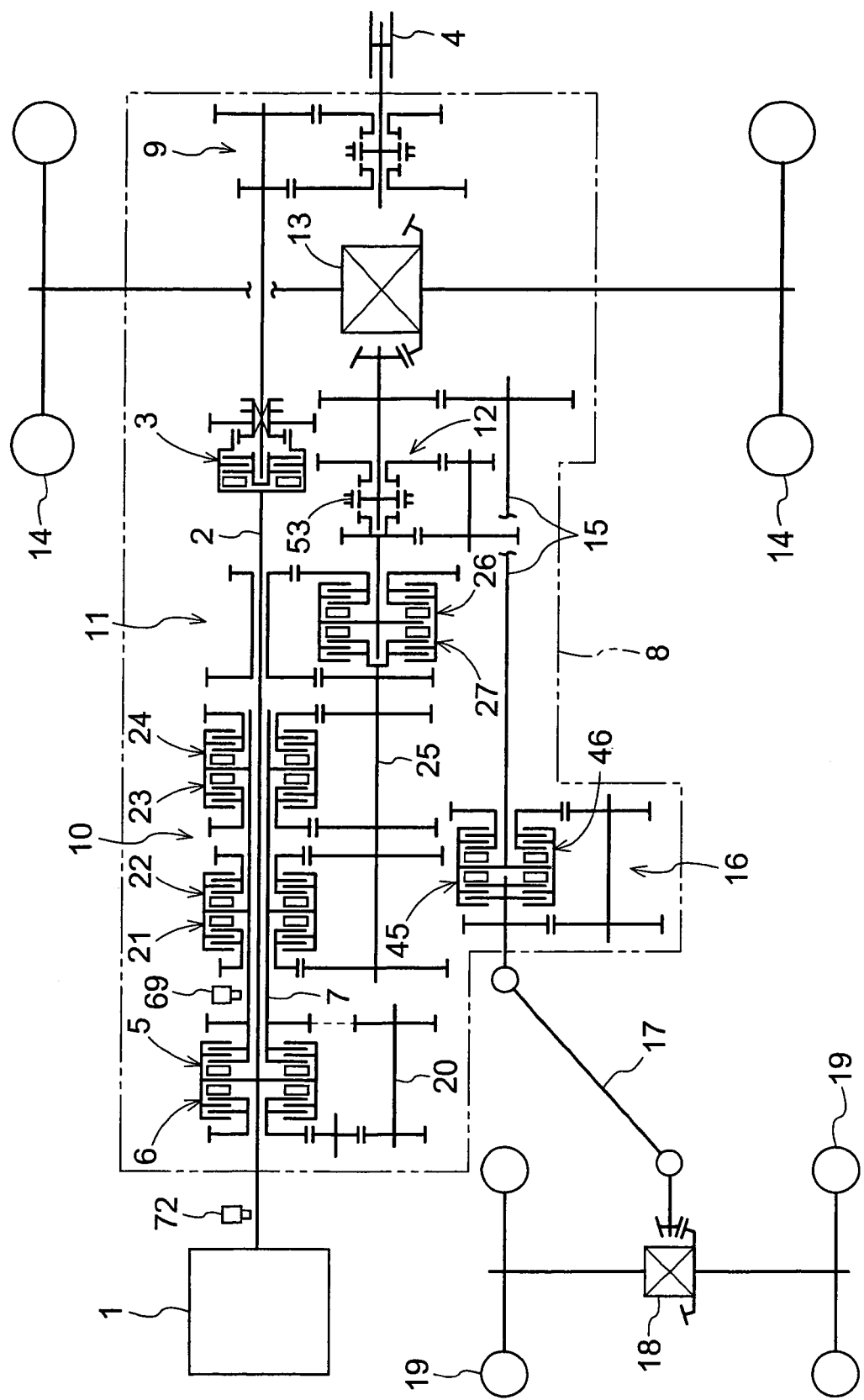
FIG. 1 is a schematic diagram of the showing the drive train in the transmission case of the vehicle.

In FIG. 1, a transmission case 8 of an four-wheel drive agricultural tractor (as an example of a work vehicle). Power from the engine 1 is transmitted through a drive train to the rear wheels 14. The drive train includes the forward travel clutch 5, reverse clutch 6, a hollow cylindrical shaft 7, a first main change speed device 10 (traveling change speed device), a second main change speed device 11, an auxiliary change speed device 12 and the rear differential 13. Power is branched out at a location immediately forwardly of the rear differential 13 to the front wheels 19 via the transmission shaft 15, front wheel change speed device 16 (which is of a hydraulic clutch type), front wheel transmission shaft 17 and the front differential 18. Power from the engine 1 is transmitted to the PTO (Power Take Off) shaft 4 via the hydraulic multi-plate clutch 3 and the PTO change speed device 9 (or PTO transmission).

As shown in FIG. 1, the forward travel clutch 5 and the reverse clutch 6 are both of a hydraulic multi-plate type with friction plates and a piston (not shown) and are actuated or engaged by supplying hydraulic fluid to the piston. When the forward travel clutch 5 is engaged, the power from the engine 1 is transmitted to the hollow cylindrical shaft 7 from the clutch 5 to move the vehicle forward. When the reverse clutch 6 is engaged, the power from the engine 1 is transmitted to the hollow cylindrical shaft 7 after the rotation is reversed though the reverse clutch 6 and the transmitting shaft 20 to move the vehicle in reverse.

As shown in FIG. 1, the first main change speed device 10 has the first clutch 21, second clutch 22, third clutch 23, and the fourth clutch 24 arranged in parallel, each of which is of a hydraulic multi-plate type hydraulic clutch and thus has four speeds. By engaging one of the first to fourth clutch 21-24, the power from the hollow cylinder shaft 7 is transmitted to the transmission shaft 25 at four different speeds.

As shown in FIG. 1, the second main speed change device 11 is a hydraulic clutch with a low speed multi-plate hydraulic clutch 26 and a high speed multi-plate hydraulic clutch 27 arranged next to each other. By engaging one of the two clutches, the power is transmitted to the auxiliary change speed device 12 at one of the two different speeds. The auxiliary change speed device 12 is of a two-speed synchro-mesh type operated by sliding the shift member 53, which is mechanically controlled by means of the speed change lever 28 shown in FIG. 2.

The hydraulic circuits associated with the forward travel clutch 5, the reverse clutch 6, first and second main speed change device 10 and 11 are described next.

Figure 3:
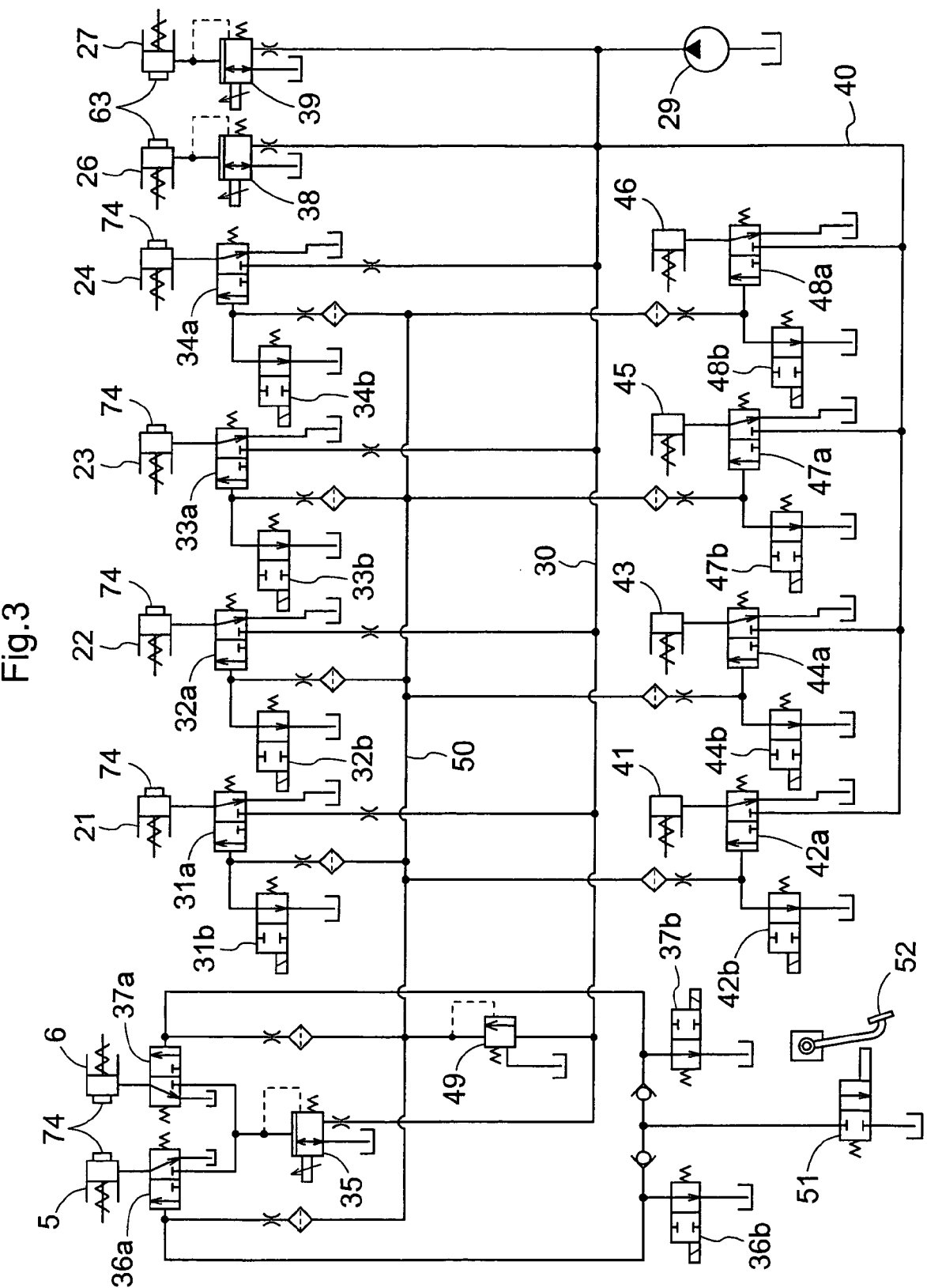
FIG. 3 is a hydraulic circuit diagram for the forward travel clutch, reverse clutch, first and second main speed change devices and other hydraulic elements.

As shown in FIG. 3, connected to the hydraulic conduit 30 from the hydraulic pump 29 are an electromagnetic proportional valve 35 and pilot controlled selector valves 36a and 37a associated with the forward travel crutch 5 and the reverse clutch 6, pilot controlled selector valves 31a, 32a, 33a, and 34a associated with the first, second third, and forth speed clutches 21 to 24, and electromagnetic proportional valves 38 and 39 associated with the low speed and the high speed clutches 26 and 27.

As shown in FIG. 3, connected to the hydraulic conduit 40 (which branches out from the conduit 30) are pilot operated selector valve 42a associated with the hydraulic clutch 41 for controlling the differential lock for the front differential 18 and the pilot operated selector valve 44a associated with the hydraulic clutch 43 for controlling the differential lock for the rear differential 13 and pilot controlled selector valves 47a and 48a associated with the standard clutch 45 and the increased speed clutch 46 of the front speed change device 16. The selector valves 31a-34a, 36a, 37a, 42a, 44a, 47a, 48a are urged towards respective disengaging positions (where hydraulic fluid is drained) and are moved to respective engaging positions (where fluid is supplied) by pilot pressure.

As shown in FIG. 3, a pilot conduit 50 branches off from the hydraulic conduit 30 via a pressure reducing valve 49. The pilot conduit 50 is connected to control portions of the selector valves 31a-34a, 36a, 37a, 42a, 44a, 47a, 48a. To the control potions, electromagnetic control valves 31b, 32b, 33b, 34b, 36b, 37b, 42b, 44b, 47b, 48b are connected. The electromagnetic control valves 31b-34b, 36b, 37b, 42b, 44b, 47b, 48b are urged toward respective fluid-draining positions by means of springs. When any of these valves is shifted away from the fluid-draining positions, pilot pressure is applied to the corresponding control portion of the selector valve to its fluid supplying (i.e. engaging) position.

The control portions of the forward travel clutch 5, the reverse clutch 6, first and second main speed change device 10 and 11 are described next.

Figure 2:
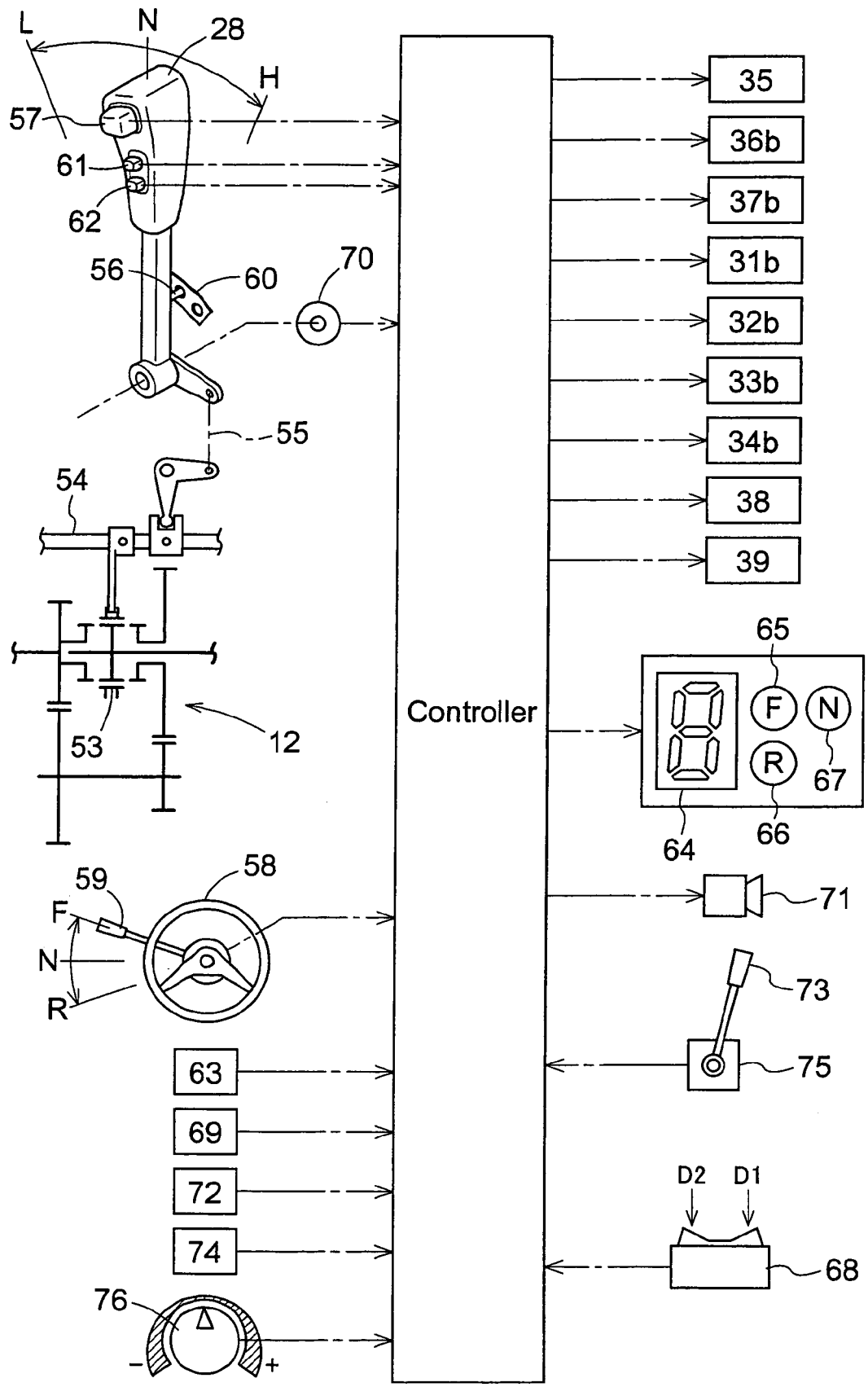
FIG. 2 is a schematic diagram showing the relationship among the controller, the speed change lever, the shift up and down button, the setting button.

As shown in FIG. 3, a switching valve 51 is provided to release pilot pressure from the control portions of the selector valves 36a and 37a. The valve 51 is urged toward its closed position by a spring. A clutch pedal 52 is provided to shift the switching valve 51 toward its release position. As shown in FIG. 2, a direction control lever 59 is provided at the base of the steering wheel 58 for the front wheels 19. The lever 59 is movable among the forward position F, the reverse position R and the neutral position N.

As shown in FIG. 2, a speed change lever 28 is pivotably supported to a lateral shaft provided in the operator's station of the vehicle. A shifting shaft 54 that slides on a shift member 53 of the auxiliary change speed device 12 and the speed change lever 28 are mechanically connected by the link mechanism 55. The shifting member 53 and thus the auxiliary change speed device 12 is shifted to its neutral, low-speed, and high-speed positions by operating the speed change lever 28 to its neutral position N, low speed position L and high speed position H respectively. A position sensor 70 is provided to detect the operated position of the speed change lever 28.

As shown in FIG. 2, a lock pin 56 is provided to a side of the speed change lever 28 such that the pin 56 can projected and retracted from the lever. A control button 57 for causing the lock pin 56 to be projected out and retracted from the lever 28 is provided in an upper section of the speed change lever 28. The lock pin 56 is urged by a spring (not shown) toward its projected position (i.e. toward right in FIG. 2). The control button is also urged toward its projected position i.e. toward left in FIG. 2. By causing the lock pin 56 to engage with the guide plate 60 of a fixed member, the change speed lever 28 is held in one of its neutral position N, low speed position L and high speed position H. When the control button 57 is pushed in, the lock pin 56 is caused to be retracted, enabling the operator to move the speed change lever 28 to one of its neutral position N low speed position L and high speed position H.

As shown in FIG. 2, a shift up button 61 and a shift down button 62 are positioned such that they are lined up vertically. When the shift up button 61 or the shift down button 62 is depressed, the first and second main speed change devices 10 and 11 are operated as described in detail below.

As shown in FIG. 2, the operator's station is provided with a speed change display (a seven segment display) for displaying the speed position (1st speed position to 8th speed position) of the first and second main speed change devices; a forward travel lamp 65 and a reverse travel lamp 66 that indicate which of the forward travel clutch 5 and the reverse clutch 6 is engaged; and a neutral lamp 67 that indicates that the speed change lever 28 or the forward/reverse lever 59 is in the neutral position N. As shown in FIG. 3, a pressure sensor 74 for detecting the operating pressure of the forward travel clutch 5 and the reverse clutch 6. One of the forward travel indicator lamp 65 and the reverse travel indicator lamp 66 is turned on based on based on the detection of the pressure sensor 74. A manually operated setter switch 68 is provided and is operable to a manual mode position as shown in FIG. 2, a traveling mode position where the switch is depressed in the direction shown at D1, and an under-load mode position where the switch is depressed in the D2 direction.

Figure 4:
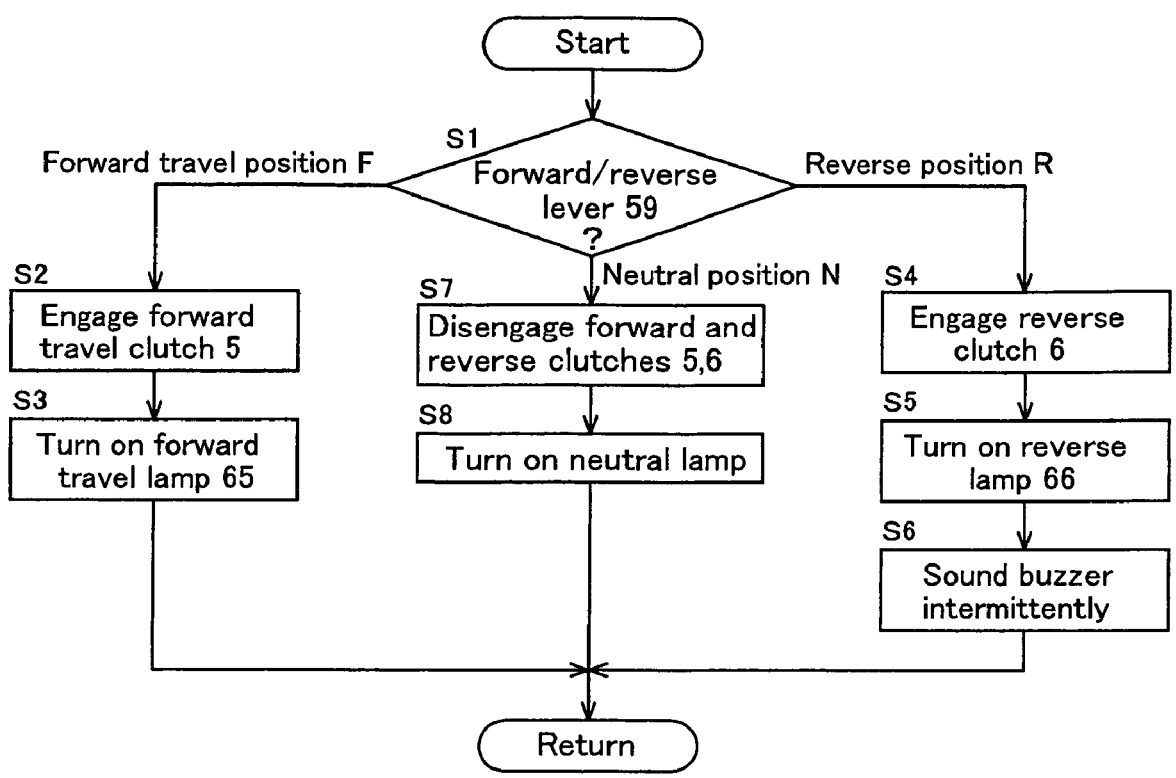
FIG. 4 is a flow chart showing the control flow when the forward/reverse travel lever is operated.

Operation of the forward/reverse lever 59 is described next with reference to FIG. 4.

When the forward/reverse lever 59 is operated to its forward position (S1), the electromagnetic valve 36b is supplied with control current causing the selector valve 36a to be shifted to the fluid-supplying position, which results in the forward travel clutch 5 being engaged (S2), turning on the forward travel indicator lamp 65 (S3). When the forward/reverse lever 59 is operated to its reverse position (S1), the electromagnetic valve 37b is supplied with control current causing the selector valve 37a to be shifted to the fluid-supplying position, which results in the reverse clutch 6 being engaged (S4), turning on the reverse travel indicator lamp 66 (S5). In addition, the alarm sound is made intermittently by the buzzer 71 (S6) shown in FIG. 2.

When the forward/reverse lever 59 is operated to its neutral position (S1), current to the electromagnetic valves 36b and 37b is cut off, causing the selector valves 36a and 37a to be shifted to respective fluid draining positions, which results in the forward travel clutch 5 and the reverse clutch 6 being disengaged (S7), turning on the neutral indicator lamp 67 (S8). When the clutch pedal 52 is depressed by a foot, the switching valve 51 is opened and the selector valves 36a and 37a are shifted to the draining positions resulting in the forward travel clutch 6 and reverse clutch 6 being disengaged and in the neutral indicator lamp 67 being turned on. When both the forward travel clutch 6 and the reverse clutch 6 are operated to their disengaged positions, power is no longer transmitted through the clutches 5 and 6 and the vehicle stops.

The manual mode of the setting switch 68 is described next with reference to FIG. 5.

The manual mode is effected when the setting switch 68 is operated to its manual mode position. As shown in FIG. 1, since the first main change speed device 10 has four speeds and the second main change speed device 11 has two speeds, the total of eight speed settings can be achieved with both main change speed devices. With the low speed clutch 26 in its engaged position, an engagement of one of the first, second, third and fourth clutches 21, 22, 23, 24 respectively corresponds to the first, second, third, and fourth speed positions. With the high speed clutch 27 in its engaged position, an engagement of one of the first, second, third and fourth clutches 21, 22, 23, 24 respectively corresponds to the fifth, sixth, seventh, and eighth speed positions.

As shown in FIGS. 2 and 3, pressure sensors 63 and 74 are provided to sense operation pressure for each of the first to fourth clutches 21-24 and each of the low speed and high speed clutches 26 and 27. The current speed position (one to eight) of the first and second main change speed devices 10 and 11 based on the measurements of the pressure sensors 63 and 74, which speed position is then displayed on the display 64.

The operator pushes either the shift up button 61 or the shift down button 62 (S11, S12) to effect ether a shift up or down. When the shift up button 61 is depressed (S11), as shown by the solid line A1 at the time B1, the clutch, among the first to fourth clutches 21-24 that corresponds to one speed higher than the current speed, is operated to start engaging by one of the electromagnetic valves 31b-34b (S13). When the shift down button 62 is depressed (S12), the clutch, among the first to fourth clutches 21-24 that corresponds to one speed lower than the current speed, is operated to start engaging by one of the electromagnetic valves 31b-34b (S14).

Figure 6:
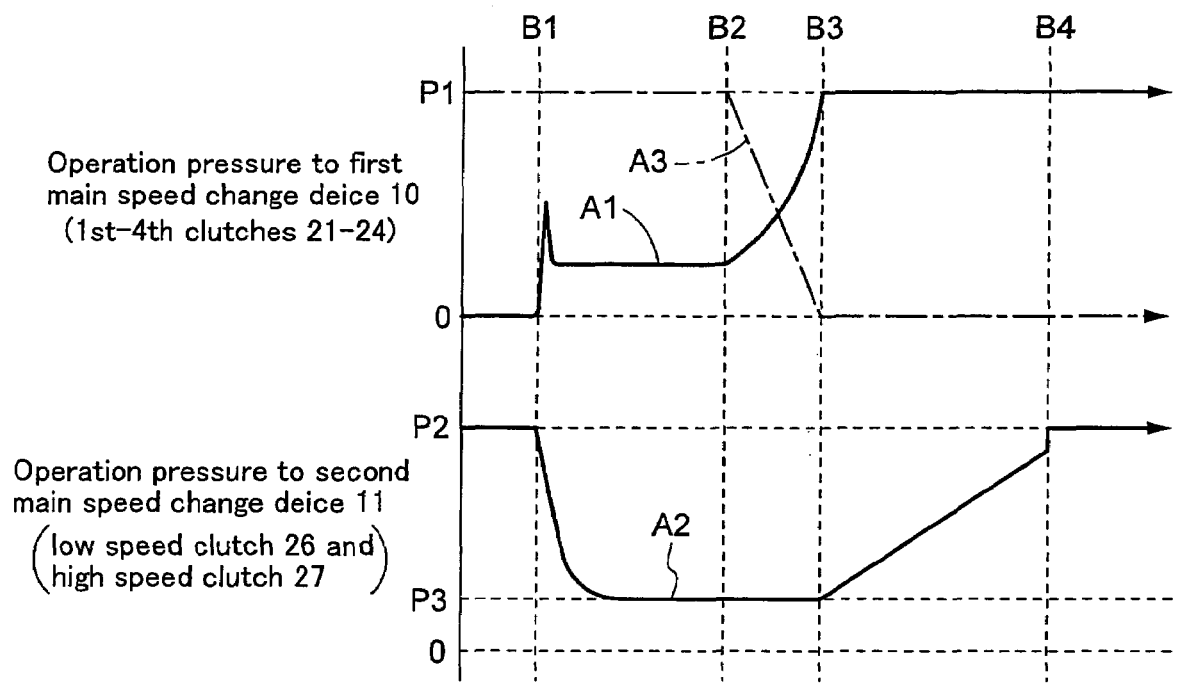
FIG. 6 is a pair of graphs showing the hydraulic pressures in the first-fourth clutches and in the low speed and high speed clutch when the shift up button or the shift down button is operated in the manual mode.

If the speed change lever 28 is in the low speed position L or the high speed position H (S15), the operating pressure to the low speed clutch 26 or the high speed clutch 27 that is engaged is reduced from the engaging pressure P2 to a predetermined lower pressure P3 concurrently with steps S13 and S14 as shown by the solid line A2 at time B1 in FIG. 6.

In this case, when shifting from the fourth speed position to the fifth speed position, the operation pressure to the low speed clutch 26 is reduced to zero while the operation pressure to the high speed clutch 27 is changed from zero to the predetermined low pressure P3. In contrast, when shifting from the fifth speed position to the fourth speed position, the operation pressure to the high speed clutch 27 is reduced to zero while the operation pressure to the low speed clutch 26 is changed from zero to the predetermined low pressure P3.

As shown by the solid line A1 (from B2 to B3) in FIG. 6, the operation pressure to the clutch, among the four clutches 21-24, that is either one speed higher or lower is beginning to be increased to the engaging pressure of P1 by corresponding one of the electromagnetic valves 31b-34b. At the same time, as shown by the dotted line A3 (from B2 to B3) in FIG. 6, the operation pressure to the clutch, among the four clutches 21-24, that is engaged before the actuation of either the shift up button 61 or the shift down button 62 is beginning to be reduced from the engaging pressure P1 to zero by corresponding one of the electromagnetic valves 31b-34b (S17).

If the speed change lever 28 is in its low speed position L or the high speed position H (S18), as shown by the solid line A2 (from B3 to B4), the operating pressure to either the low speed clutch 26 or the high speed clutch 27 is gradually increased from the predetermined low pressure P3 by the electromagnetic proportional valve 38 or 39 (S19). This causes the power from the clutch, among the four clutches 21-24, that is either lower or higher than before to begin to be transmitted though either the low speed clutch 26 or the high speed clutch 27. As the solid line A2 at time B4 in FIG. 6 shows, when the pressure sensor 63 detects that the operation pressure of the low speed clutch 26 or the high speed clutch 27 reached the engaging pressure P2 (S20), the speed change operation initiated by depressing the shift up button 61 or the shift down button 62 is determined to have been completed. Then the speed position as the result of the operation is displayed on the speed change display 64 (S21) and the operator is informed of the end of the speed change operation by a single sounding of the buzzer 71 (S22). This allows the system to move to step S11 to allow the operator to effect another speed change operation by depressing either the shift up button 61 or the shift down button 62.

If the speed change lever 28 is in the neutral position N, the shift member 53 and thus the auxiliary change speed device 12 is in the neutral position and thus the vehicle does not move. If either the shift up button 61 or the shift down button 62 is operated while the speed change lever 28 is in neutral position (S11, S12), as before, the first and second main speed change devices 10 and 11 (first to fourth clutches 21-24 and low speed and high speed clutches 26, 27) are operated to one speed position higher or lower (S13, S14, S17). The resulting speed position is then displayed on the display 64 and the buzzer 71 makes a single sound (S22).

In this case, since the vehicle is not moving, reduction of the operation pressure of the low speed clutch 26 or the high speed clutch 27 to the predetermined low pressure P3 or raising to the engaging pressure P2 such as the steps S16 or S19 is not performed.

Figure 7:
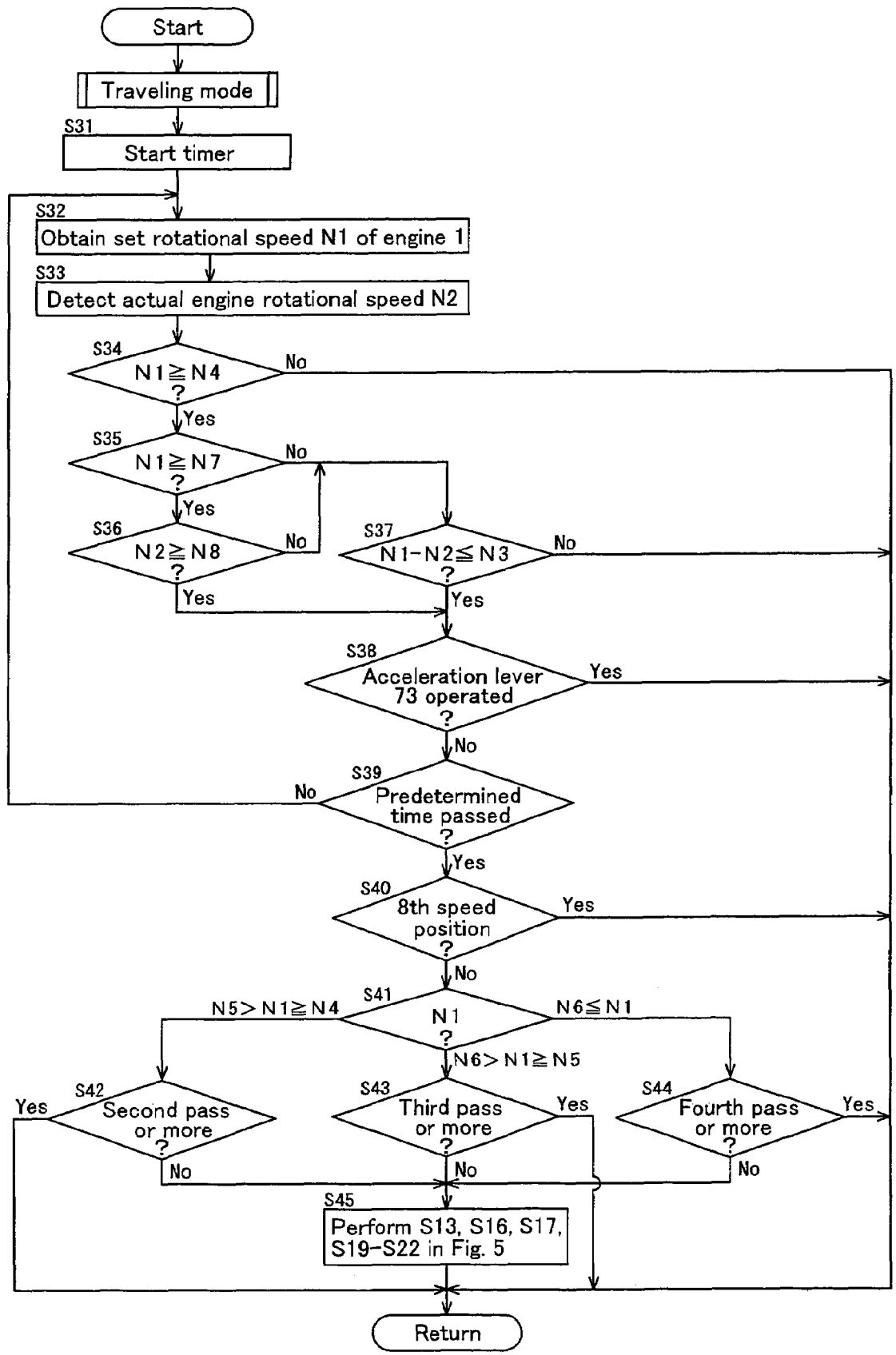
FIG. 7 is a flow chart showing the control flow when the first and the second main speed change devices are automatically shifted to a higher speed position in the traveling mode.

Automatic speed change of the first and second main speed change devices 10 and 11 to a higher speed position while the setting switch 68 is in the traveling mode position is described next with reference to FIG. 7.

The traveling mode suitable for traveling on a road is effected when the setting switch 68 is operated to its traveling mode position. As shown in FIGS. 1 and 2, the work vehicle has a hand-operated acceleration lever 73 (acceleration control member) capable of manually controlling the accelerator for the engine 1, a potentiometer type sensor 75 for sensing the position of the hand-operated acceleration lever 73 and a rotation sensor 72 (rotational speed detecting means) that detects the actual rotational speed N2 of the engine 1. The relationship between the rotational speed of the engine 1 when there is no load (where the forward travel and reverse clutches 5 and 6 are disengaged and the PTO clutch 3 is disengaged so that there is no load on the engine 1) and the detected value from the sensor 75 (corresponding to the hand operated acceleration lever 73) is determined in advance. The detected value from the sensor 75 is then used to obtain the rotational speed of the engine 1 under no load as the set rotational speed N1 of the engine 1.

As described above, when the first and second main speed change devices 10 and 11 are actuated by the operation of either the up shift button 61 or the down shift button 62, the timer is started (S31) and the set rotational speed N1 of the engine 1 is obtained (S32) and the actual rotational speed N2 of the engine is measured (S33). For example, suppose that the set rotational speed N1 of the engine 1 is greater than or equal to the first predetermined rotational speed N4 (e.g. 1200 rpm) (S34), and that the difference between the set rotational speed N1 of the engine 1 and the actual rotational speed N2 of the engine 1 is less than or equal to a predetermined value N3 (e.g. 100 rpm) (S37), and further that the hand-operated acceleration lever 73 is not operated for a predetermined period of time (e.g. 2 seconds) (S39). (If the set rotational speed N1 of the engine 1 is greater than equal to the fourth predetermined rotational speed N7 (e.g. 2400 rpm) (S35) and the actual rotational speed N2 of the engine 1 is greater than or equal to the fifth predetermined rotational speed N8 (e.g. 2300 rpm), then the steps from S35 to S37 are skipped and the routine moves to S38.)

Figure 5:
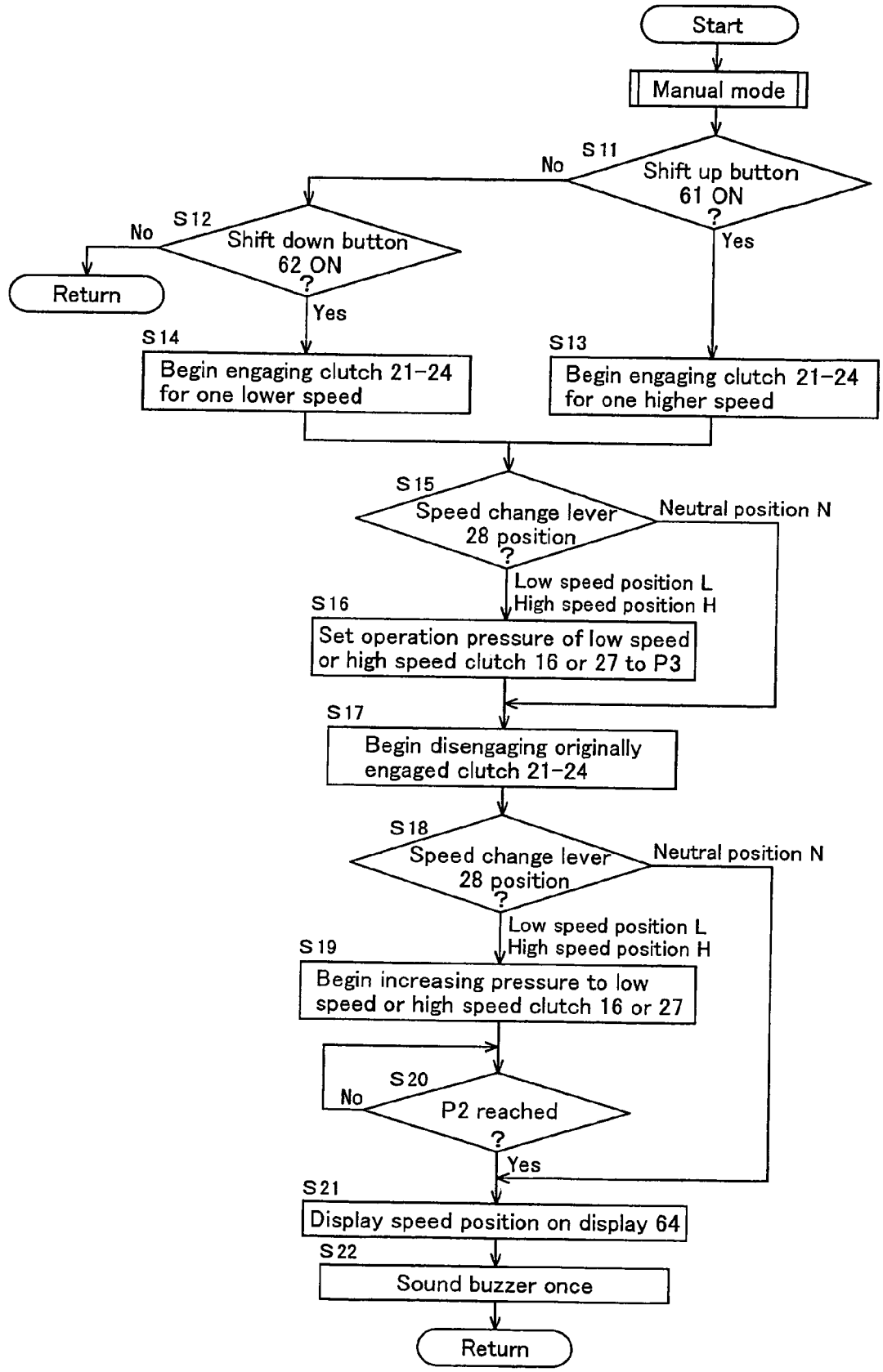
FIG. 5 is a flow chart showing the control flow when the shift up button or the shift down button is operated in the manual mode.

If the conditions in the steps S34, S37, and S38 are met for a predetermined period of time (e.g. two seconds) (S39), the steps S13, S16, S17, S19-S22 in FIG. 5 are carried out and the first and second main speed change devices 10 and 11 are shifted to one higher speed position (S45). The set rotational speed N1 of the engine 1 obtained in S32 is greater than or equal to the first predetermined rotational speed N4 (e.g. 1200 rpm) and less than the second predetermined rotational speed N5 (e.g. 1400 rpm) (S41), then the steps S13, S16, S17, S19-S22 are carried out once (S42, S45). In this case, if the first and second main speed change devices 10 and 11 are in the eighth speed position (S40), the steps S13, S16, S17, and S19-S22 in FIG. 5 are not carried out.

If the conditions in steps S34, S37, and S38 are met for a predetermined period of time (e.g. two seconds) (S39) after the first and second main speed change devices 10, 11 are shifted to one higher speed position (S42, S45) as described above, and if the set rotational speed N1 of the engine 1 obtained in S32 is greater than or equal to the second predetermined rotational speed N5 (e.g. 1400 rpm) and less than the third predetermined rotational speed N6 (e.g. 1600 rpm), then the steps S13, S16, S17, S19-S22 in FIG. 5 are carried out to shift the first and second main speed change devices 10, 11 to one speed position higher (S43, S45). Therefore, the first and second main speed change devices 10, 11 are shifted by two speed positions higher with respect to steps S42 and S45 described above. In this case, if the first and second main speed change devices 10 and 11 are in the eighth speed position (S40), the steps S13, S16, S17, and S19-S22 in FIG. 5 are not carried out.

If the conditions in steps S34, S37, and S38 are met for a predetermined period of time (e.g. two seconds) (S39) after the first and second main speed change devices 10, 11 are shifted to one higher speed position (S41, S43, S45) as described above, and if the set rotational speed N1 of the engine 1 obtained in S32 is greater than or equal to the third predetermined rotational speed N6 (e.g. 1600 rpm), then the steps S13, S16, S17, S19-S22 in FIG. 5 are carried out to shift the first and second main speed change devices 10, 11 to one speed position higher (S44, S45). Therefore, the first and second main speed change devices 10, 11 are shifted by three speed positions higher with respect to the S42 and S45 described above. In this case, if the first and second main speed change devices 10 and 11 are in the eighth speed position (S40), the steps S13, S16, S17, and S19-S22 in FIG. 5 are not carried out.

Figure 8:
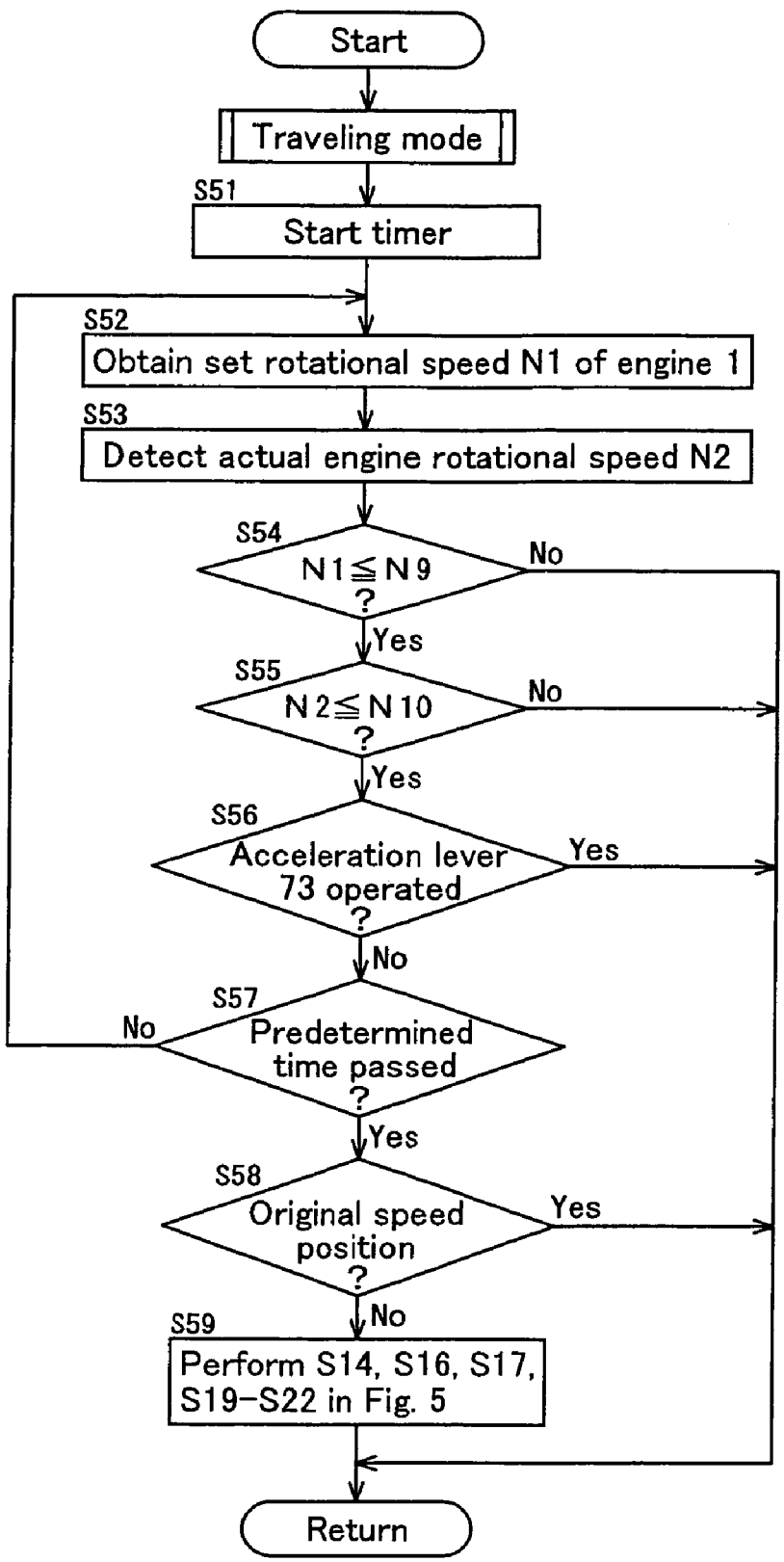
FIG. 8 is a flow chart showing the control flow when the first and the second main speed change devices are automatically shifted to a lower speed position in the traveling mode.

Automatic speed change of the first and second main speed change devices 10 and 11 to a lower speed position while the setting switch 68 is in the traveling mode position is described next with reference to FIG. 8.

When the first and second main speed change devices 10 and 11 are automatically shifted to a higher speed position as described above, the timer is started (S51) and the set rotational speed N1 of the engine 1 is obtained (S52) and the actual rotational speed N2 of the engine is detected (S53). Suppose that the set rotational speed N1 of the engine 1 is less than or equal to the sixth predetermined rotational speed N9 (e.g. 1000 rpm) (S54) and that the actual rotational speed N2 of the engine 1 is less than or equal to the seventh predetermined rotational speed N10 (e.g. 2300 rpm) (S55) and that the hand-operated acceleration lever 73 is not operated (S56) for a predetermined period of time (e.g. 0.75 seconds) (S57).

If the conditions in the steps S54, S55, and S56 are met for a predetermined period of time (e.g. 0.75 seconds) (S57), the steps S14, S16, S17, S19-S22 in FIG. 5 are carried out and the first and second main speed change devices 10 and 11 are shifted to one lower speed position (S59). If the conditions in the steps S54, S55, and S56 are met for a predetermined period of time (e.g. 0.75 seconds) (S57) after the first and second main speed change devices 10 and 11 are shifted to one lower speed position (S59), the steps S14, S16, S17, S19-S22 in FIG. 5 are carried out and the first and second main speed change devices 10 and 11 are shifted to one lower speed position (S59).

In this case, if the first and second main speed change devices 10 and 11 reaches the original speed position (S58) that was commanded by the operation of the shift up button 61 or the shift down button 62, even if the operation to lower the first and second main speed change devices 10 and 11 by one lower speed position is repeated, the steps S14, S16, S17, and S19-S22 in FIG. 5 are not carried out.

Figure 9:
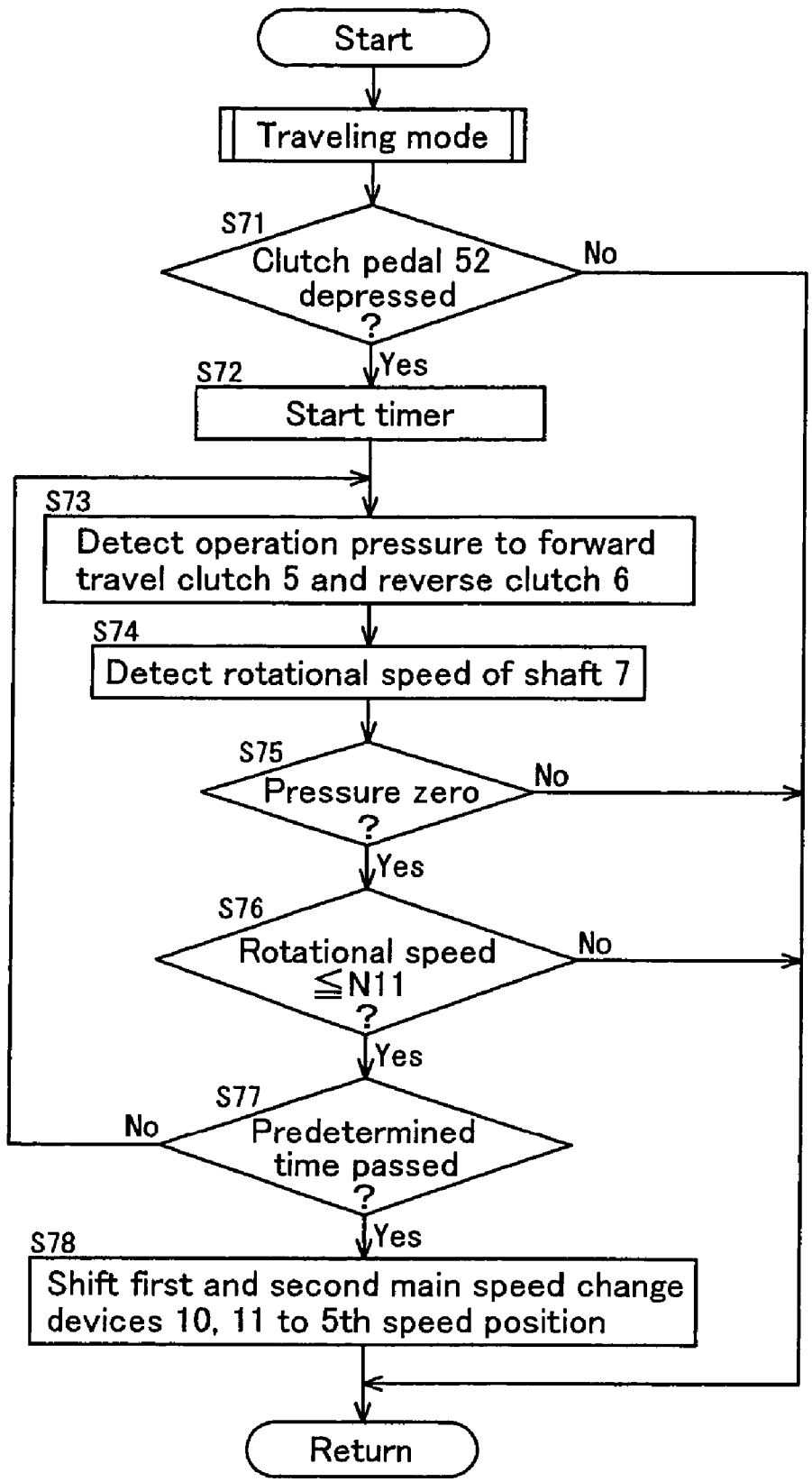
FIG. 9 is a flow chart showing the control flow when the first and the second main speed change devices are automatically shifted to the fifth speed position in the traveling mode.

As shown in FIG. 9, when the clutch pedal 52 is depressed and the switching valve 51 is switched to the draining position to move the selector valves 36a and 37a to their draining position and to disengage the forward travel clutch 5 and the reverse clutch 6 (S71), the timer is started (S72) and the operation pressure to the forward travel clutch 5 and the reverse clutch 6 are detected (S73) and the rotational speed of the hollow cylinder shaft 7 is detected (S74) by the rotational speed sensor 69 provided downstream of the forward travel clutch 5 and the reverse clutch 6 as shown in FIGS. 1 and 2.

If the hydraulic pressure to the forward travel clutch 5 and the reverse clutch 6 is zero (S75), and if the rotational speed of the hollow cylindrical shaft 7 is less than or equal to the eighth predetermined rotational speed N11 (e.g. 1000 rpm) for a predetermined period of time (e.g. 0.75 seconds) (S77), it will be determined that the vehicle is stopped or the speed of the vehicle is very low and the first and second main speed change devices 10 and 11 are automatically shifted to the fifth speed position (S78).

Figure 10:
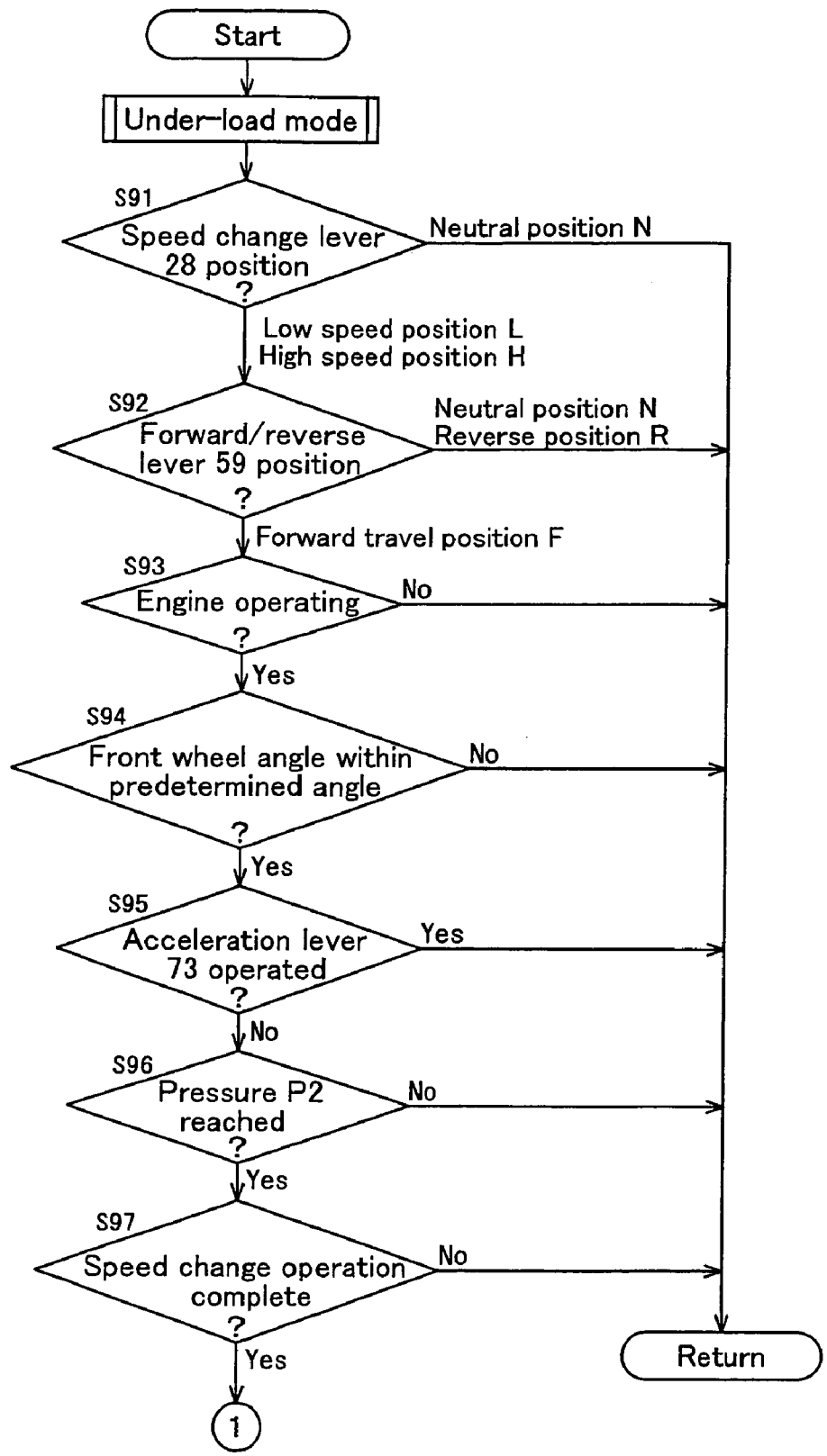
FIG. 10 is a flow chart showing the first half of the control flow when the first and the second main speed change devices are automatically shifted to a lower speed position and a higher speed position in the under-load mode.
Figure 11:
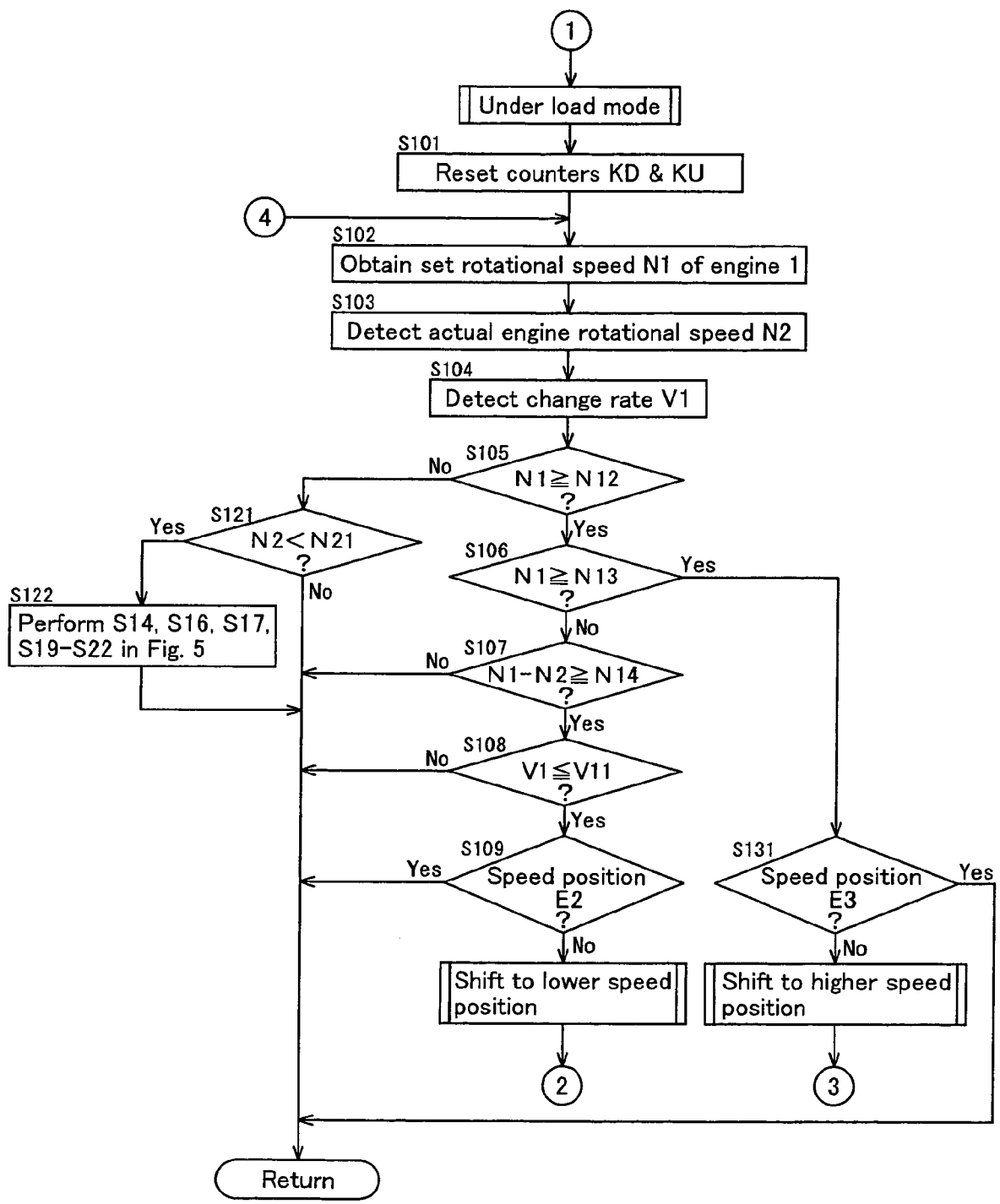
FIG. 11 is a flow chart showing the second half of the control flow when the first and the second main speed change devices are automatically shifted to a lower speed position and a higher speed position in the under-load mode.
Figure 12:
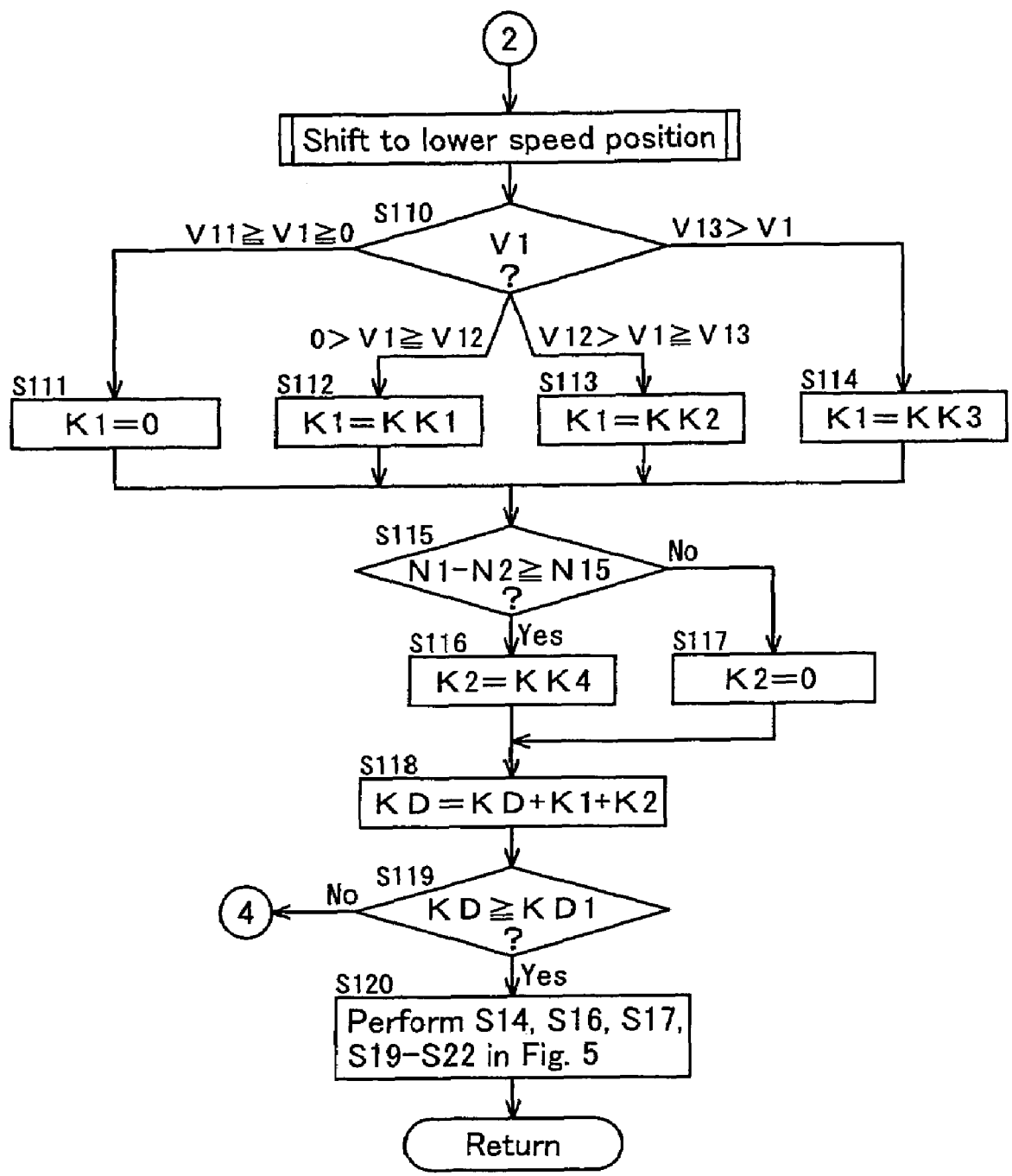
FIG. 12 is a flow chart showing the control flow when the first and the second main speed change devices are automatically shifted to a lower speed position in the under-load mode.

Automatic speed change of the first and second main speed change devices 10 and 11 to a lower speed position while the setting switch 68 is in the under-load mode position is described next with reference to FIGS. 10, 11, and 12.

The under-load mode is effected when the setting switch 68 is operated to its under-load mode position. The step S101 is reached when the speed change lever 28 is operated to its low speed position L or the high speed position H (S91), and the forward/reverse lever 59 is operated to its forward travel position F (S92), and the engine 1 is running (S93), and the steering angle of the front wheels 19 is within a right and left predetermined angles from the straight forward position (S94) (i.e. the vehicle is not in a tight turn), and the hand-operated acceleration lever 73 is not operated (S95) (e.g., change in the set rotational speed N1 of the engine 1 is within plus or minus 50 rpm/100 milliseconds), and the operation pressure to the low speed clutch 26 or the high speed clutch 27 is at the engaging pressure P2 (S96), and operation of the shift up button 61 or the shift down button 62 has been completed and a speed change operation described above and below is completed (S97).

When S101 is reached, the lower speed counter KD and the higher speed counter KU described below are reset and the set rotational speed N1 of the engine 1 is obtained (S102), and the actual rotational speed of the engine 1 is detected (S103) and the change rate V1 of the actual rotational speed N2 of the engine is detected (S104). If the set rotational speed N1 of the engine 1 is greater than or equal to the ninth predetermined rotational speed N12 (e.g. 1300 rpm) and less than the tenth predetermined rotational speed N13 (e.g. 1600 rpm) (S106), then the step S107 is reached.

After S107 is reached, the routine moves to S110 if the difference between the set rotational speed N1 of the engine 1 and the actual engine rotational speed N2 is greater than or equal to the second set value N14 and if the change rate V1 is less than or equal to the predetermined change rate V11 (e.g. 10 rpm/200 milliseconds) (S108) and the speed position of the first and second speed change devices 10, 11 is not the lowest position E2 on the low speed side (S109).

In this case, the fact that difference between the first set rotational speed N1 of the engine 1 and the actual engine rotational speed N2 is greater than or equal to the second set value N14 (S107) indicates that the actual rotational speed N2 of the engine 1 is decreasing.

A positive value of the change rate V1 indicates that the actual engine rotational speed N2 is increasing. A negative change rate V1 means that the actual engine rotational speed N2 is decreasing. Thus, if the change rate V1 is less than or equal to a predetermined change rate V11 (e.g. 10 rpm/100 milliseconds) (S108), that is an indication that the actual engine rotational speed N2 is barely changing if V1 is positive, or that the actual engine rotational speed N2 is decreasing if V1 is negative.

Figure 14:
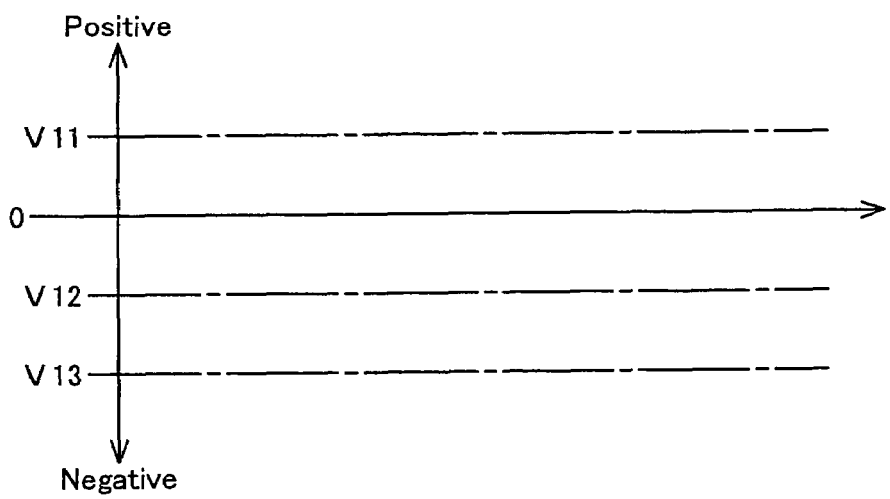
FIG. 14 is a graph showing relationships among different predetermined change rates.

When S110 is reached, the counter K1 is set depending on the difference between the predetermined change rate V11 and the change rate V1 (S111-S114). As shown in FIG. 14, there are three more predetermined values (0, V12 which has a negative value, and V13 which is less than V12) which are predetermined with respect to V11. Depending on which of the four regions (less than or equal to V11 and greater than 0; less than 0 and greater than or equal to V12; less than V12 and greater than or equal to V13; less than V13) defined by those values the value of the change rate V1 falls into, the counter K1 is set to 0, KK1, KK2, KK3 respectively. In the present embodiment, these values satisfy the relationship 0<KK1<KK2<KK3.

If the difference between the set rotational speed N1 of the engine 1 and the actual rotational speed N2 of the engine 1 is greater than or equal to the third predetermined value N15 (e.g. 1.5 times the value of the second set value N14) (S115), then the counter K2 is set to KK4 (which is greater than KK3) (S116). If the difference between the set rotational speed N1 of the engine 1 and the actual rotational speed N2 of the engine 1 is less than the third predetermined value N15 (S115), then the counter K2 is set to zero (S117).

Once the counters K1 and K2 are set as described above, the values of K1 and K2 are added to the lower speed counter KD (S118).

As the steps S102-S118 are repeated, K1 and K2 are added to the lower speed counter KD which increases the value of KD. When the lower speed counter KD reaches the predetermined lower speed counter value KD1 (S119) the steps S14, S16, S17, S19-S22 in FIG. 5 are carried out and the first and second main speed change devices 10 and 11 are shifted to one speed position lower (S120).

Under normal conditions, the lower speed counter KD may reach the predetermined lower speed counter KD1 in about 0.75 seconds. As can be seen from the steps S112, S113, and S114, the lesser the value of the change rate V1 with respect to the predetermined change rate V11, the greater value the counter K1 will have. Also, as can be seen from steps S115 and S116, in the event that the actual engine rotational speed N2 experiences a large drop, the counter K2 is set to have a large value so that the lower speed counter KD reaches the predetermined counter value KD1 more quickly to shorten the time to shift the first and second main speed change devices 10, 11 to a lower speed position.

In contrast, as can be seen from the step S111, if there is no difference between the predetermined change rate V11 and the change rate V1, the counter K1 will be set to zero. As can be seen from steps S115 and S117, if the actual engine rotational speed N2 does not drop appreciably, the counter K2 is set to zero so that the lower speed counter KD takes a long time to reach the predetermined counter value KD1, delaying the shift of the first and second main speed change devices 10, 11 to one speed position lower.

At S108, if the change rate V1 becomes greater than the predetermined change rate (e.g. 10 rpm/200 milliseconds), it is determined that the actual engine rotation speed N2 is increasing, and the routine reaches S101 to reset the lower speed counter KD.

At step S105, if the actual engine rotation speed N2 becomes less than the eleventh predetermined rotational speed N21 (e.g. 1500 rpm) (S121) while the engine set rotation speed N1 is less than the ninth predetermined rotational speed N12 (e.g. 1300 rpm), the steps S14, S16, S17, S19-S22 in FIG. 5 are carried out and the first and second main speed change devices 10 and 11 are shifted to one lower speed position (S122) regardless of the lower speed counter KD.

As shown in FIG. 2, a manually operable dial-type sensitivity adjusting switch 76 as a part of the adjusting means is provided to the operator's station. As shown by the solid lines A4 and A5 in FIG. 13, the first set value N16 described below and second set value N14 are set and adjusted by the sensitivity adjusting switch 76.

If the difference between the set rotational speed N1 of the engine 1 and the actual rotational speed N2 of the engine 1 becomes greater than or equal to the second set value N14 (i.e. the difference falls into the region for shift to one lower speed), the first and second main speed change devices 10, 11 are shifted to one speed position lower. If the difference between the set rotational speed N1 of the engine 1 and the actual rotational speed N2 of the engine 1 is between the first set value N16 and the second set value N14 (i.e. the difference falls into the region for regular control), the first and second main speed change devices 10, 11 are not shifted to either a higher speed position or a lower speed position.

Automatic speed change of the first and second main speed change devices 10 and 11 to a higher speed position while the setting switch 68 is in the under-load mode position is described next with reference to FIGS. 11 and 15.

Figure 15:
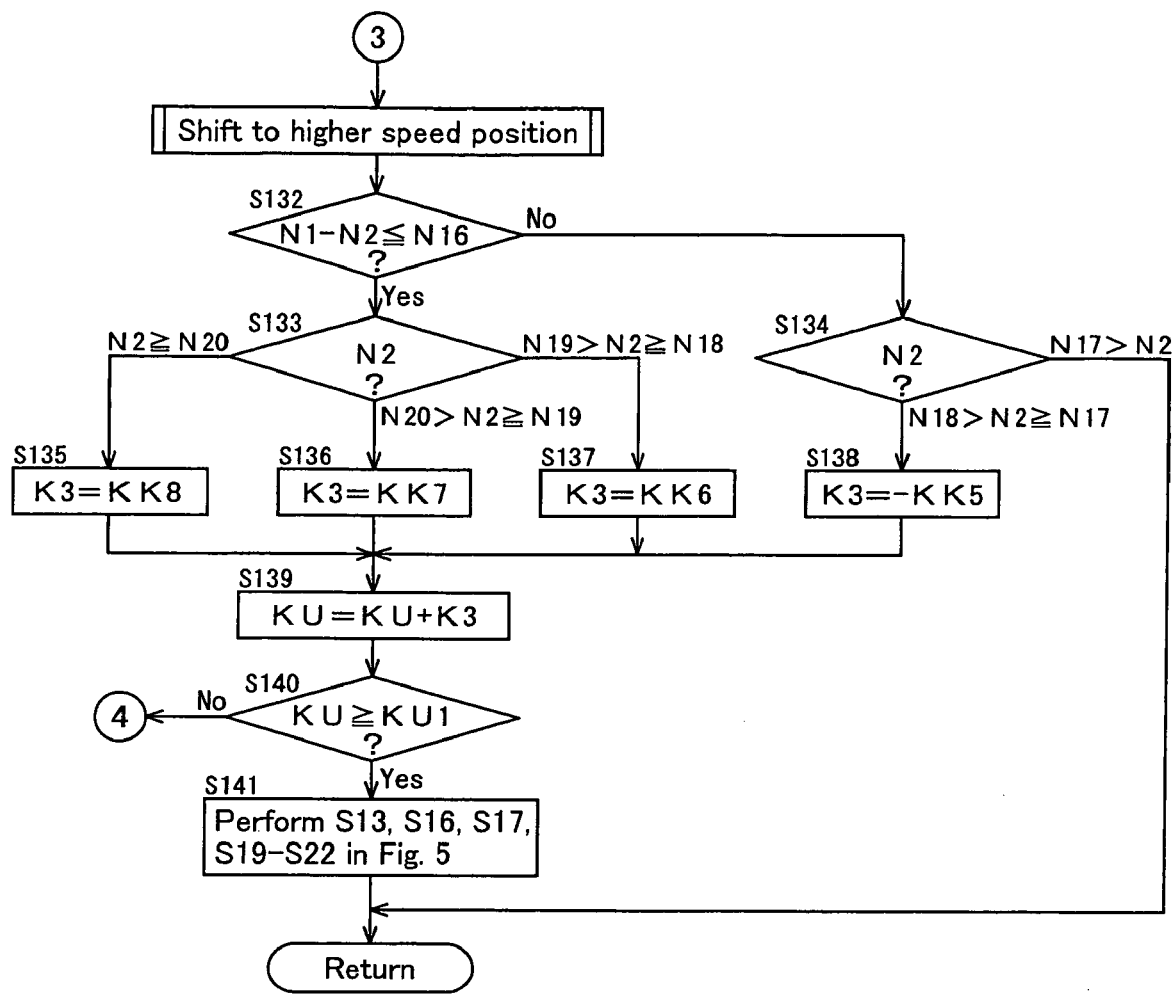
FIG. 15 is a flow chart showing the control flow when the first and the second main speed change devices are automatically shifted to a higher speed position in the under-load mode.

At step S106, if the set rotational speed N1 of the engine is greater than or equal to the tenth predetermined rotational speed N13 (e.g. 1600 rpm), and if the speed position of the first and second main speed change devices 10, 11 is not the limit position E3 on the high speed side described above (S131), then the routine goes to S132 in FIG. 15.

After S is reached, the difference between the set rotational speed N1 of the engine 1 and the actual engine rotational speed N2 is detected. If the difference is less than or equal to the first set value N16, it is determined that the actual engine rotational speed N2 is increasing. The first set value N16 (that defines the region for shifting to a higher speed position) is set as shown by the solid line A5 in FIG. 13. If the difference between the set rotational speed N1 of the engine 1 and the actual rotational speed N2 is less than or equal to the first set value N16 (S132), the counter K3 is set depending on the actual engine rotational speed N2 (S133).

Figure 16:
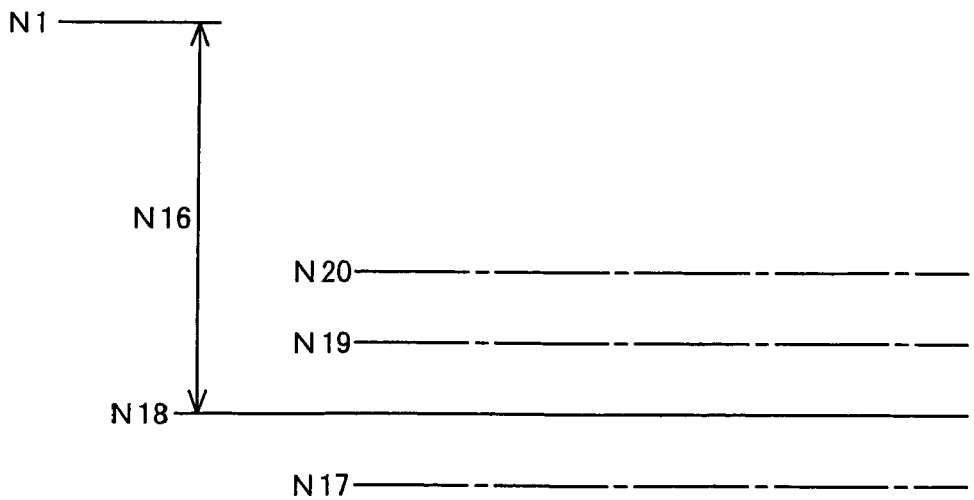
FIG. 16 is a graph showing relationships of different values in the under-load mode.

The values of N17, N19, and N20 are set with respect to N18 which corresponds to the first set value N16 as shown in FIG. 16 and these values satisfy the relationship N17<N18<N19<N20. These values define five regions: one with values greater than or equal to N20; one with values less than N20 and greater than or equal to N19; one with values less than N19 and greater than or equal to N18; one with values less than N18 and greater than or equal to N17; and one with values less than N17. Depending on which region the actual engine rotational speed N2 falls into (S133), the counter K3 takes on one of the values KK6, KK7, and KK8 respectively (S135, S136, S137). In the present embodiment, these values KK6, KK7, KK8 are positive values and they satisfy the relationship KK6<KK7<KK8.

If the difference between the set rotational speed N1 of the engine 1 and the actual engine rotational speed N2 is greater than the first set value N16 (S132), and if the actual engine rotational speed N2 is less than N18 and greater than or equal to N17 (S134), the counter K3 is set to -KK5 (S138). This "-KK5" has a negative value.

Once the counter K3 is set as described above, the values of K3 is added to the higher speed counter KU (S139). If the value of KK6, KK7 or KK8 is added to the higher speed counter KU, the value of the counter KU increases, whereas the value of -KK5 is added to the higher speed counter KU, the value of KU decreases.

As the steps S102-S139 are repeated, K3 is added to the higher speed counter KU, which increases the value of KU. When the higher speed counter KU reaches the predetermined higher speed counter value KU1 (S140) the steps S13, S16, S17, S19-S22 in FIG. 5 are carried out and the first and second main speed change devices 10 and 11 are shifted to one speed position high (S141).

Under normal conditions, the higher speed counter KU may reach the predetermined higher speed counter KU1 in about 2.0 seconds. As can be seen in steps S135, S136, and S137, the greater the actual rotational speed N2 of the engine 1 becomes with respect to the value N18 corresponding to the first set value N16 (that is, the smaller the difference between the set rotational speed of the engine 1 and the actual engine rotational speed N2 becomes with respect to the first set value N16), the greater value the counter K3 is set to. Therefore, the higher speed counter KU reaches the higher speed set counter KU1 more quickly and the shifting of the first and the second main speed change devices 10, 11 to one higher speed position is effected more quickly.

In contrast, as can be seen in step S138, if the actual rotational speed N2 of the engine 1 becomes smaller than the value N18 corresponding to the first set value N16 (that is, the smaller the difference between the set rotational speed of the engine 1 and the actual engine rotational speed N2 becomes greater than the first set value N16), since the counter K3 is set to a negative value "-KK5", it takes longer for the higher speed counter KU to reach the higher speed set counter KU1 delaying the shifting of the first and second main speed change devices 10, 11 to one speed position higher.

At S134, when the actual engine rotational speed N2 becomes less than N17 (see FIG. 16), it is determined that the actual engine rotational speed is not increasing, in which case the routine moves to S101 and the higher speed counter KU is reset.

As explained above, and as shown in FIG. 2, the sensitivity adjusting switch 76 is used to set and change the values of the first value N16 and the second set value N14.

If the difference between the set rotational speed N1 of the engine 1 and the actual rotational speed N2 of the engine 1 becomes less than or equal to the first set value N16 (i.e. the difference falls into the region for shift to one higher speed), the first and second main speed change devices 10, 11 are shifted to one speed position higher. If the difference between the set rotational speed N1 of the engine 1 and the actual rotational speed N2 of the engine 1 is between the first set value N16 and the second set value N14 (i.e. the difference falls into the region for regular control), the first and second main speed change devices 10, 11 are not shifted to either a higher speed position or a lower speed position.

The setting of the first set value N16 and the second set value N14 by the sensitivity adjusting switch 76 is described next.

Figure 13:
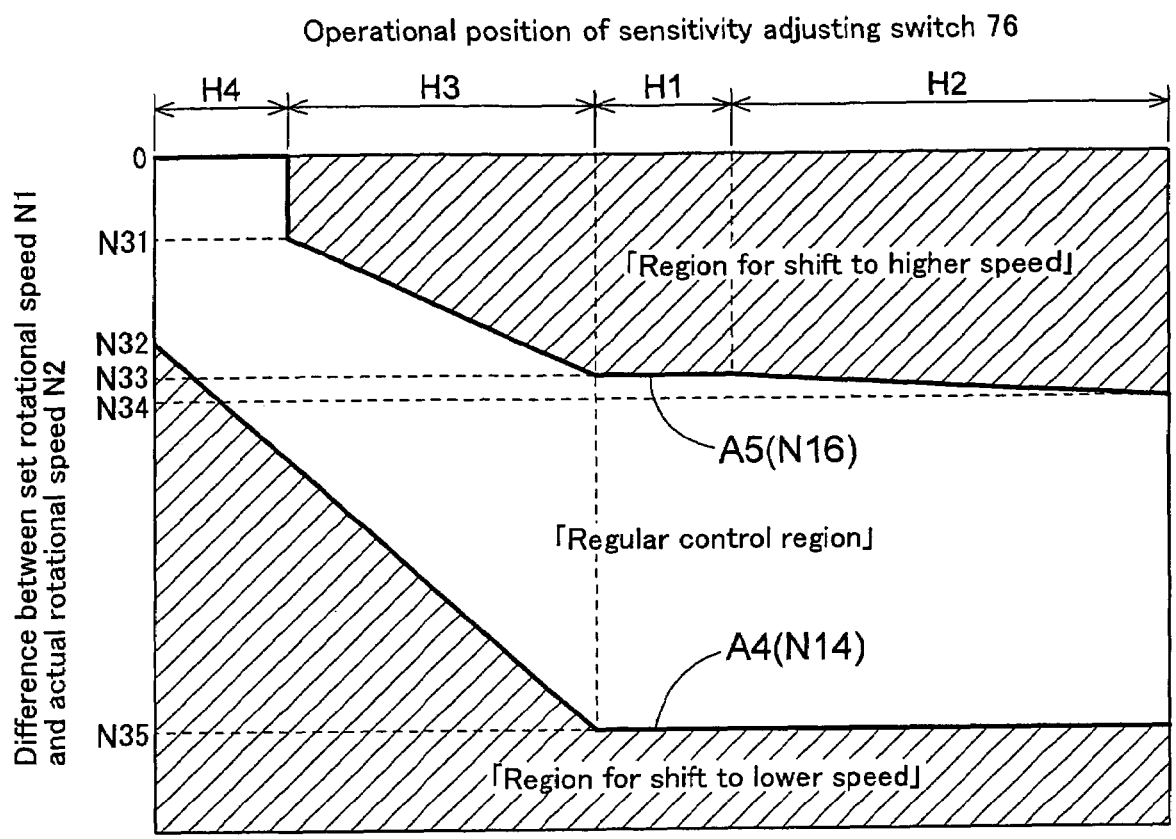
FIG. 13 is a diagram showing the relationship between the adjusting position of the sensitivity adjusting switch and the first and second set values.

As shown in FIG. 13, the first set value N16 (shown with a solid line A5) and the second set value N14 (solid line A4) are set by operating the sensitivity adjusting switch 76. Three regions defined by the first and second set values N16 and N14 are: region for shift to one higher speed, region for standard control, and region for shift to one lower speed.

Accordingly, as described above, when the difference between the set rotational speed N1 of the engine 1 and the actual engine rotational speed N2 becomes greater than or equal to the second set value N14 (in the region for shift to one lower speed), the first and second main speed change devices 10, 11 are shifted to one speed position lower. When the difference between the set rotational speed N1 of the engine 1 and the actual engine rotational speed N2 is between the first and the second set values N16 and N14 (in the region for standard control), the first and second main speed change devices 10, 11 are not shifted to either a lower or a higher position. When the difference between the set rotational speed N1 of the engine 1 and the actual engine rotational speed N2 becomes less than or equal to the first set value N16 (in the region for shift to one higher speed), the first and second main speed change devices 10, 11 are shifted to one speed position higher.

As shown in FIG. 13, when the sensitivity adjusting switch 76 is operated so that it is in the operating range H1, the fist set value N16 is kept at N33 and the second set value N14 at N35.

When the sensitivity adjusting switch 76 is operated so that it is in the operating range H2, the second set value N14 remains at N33 while the first set value N16 is adjusted linearly between a small range between N33 and N34 depending on the operating position of the switch 76. The relationship N33<N34<N35 is satisfied by these values. This is an example of where the first set value N16 can be adjusted to a greater value or to a less value while the second set value N14 is kept at a constant value.

As shown in FIG. 13, when the sensitivity adjusting switch 76 is operated so that it is in the operating range H3, the fist set value N16 is changed linearly between the range N31 and N33 depending on the position of the switch 76. The relationship N31<N33 is satisfied by these values. The difference between N31 and N33 is greater than the difference between N33 and N34 so that the change in the value of the first set value N16 in the range H3 is greater than the change in N16 in the range H2. In this case, the first and second set values N16 and N14 can be adjusted to lower values simultaneously or the first and second set values N16 and N14 can be adjusted to lower values simultaneously.

As shown in FIG. 13, when the sensitivity adjusting switch 76 is operated so that it is in the operating range H4, the fist set value N16 is set to zero. Accordingly, when the sensitivity adjusting switch 76 is in the operating range H4 so that the first set value N16 is zero, the first and second main speed change devices 10, 11 are not shifted to a higher speed position described above.

As shown in FIG. 13, when the sensitivity adjusting switch 76 is operated so that it is in the operating range H3 and H4, the second set value N14 is changed linearly between the range N32 and N35 depending on the position of the switch 76. The relationship 0<N31<N32<N33<N34<35 is satisfied by these values. The difference between N32 and N35 is greater than the difference between N33 and N34 or between N31 and N33 so that the change in the value of the second set value N14 in the ranges H3 and H4 is greater than the change in the fist set value N16 in the range H2 or H3 (shown at A4). This is an example where the first and second set values N16 and N14 can be adjusted to lower values simultaneously or the first and second set values N16 and N14 can be adjusted to lower values simultaneously.

As described above, the first and second main speed change devices 10,11 in the under-load mode are automatically operated within the range defined by the lower and higher speed position limits E2 and E3 (S109, S131). The devices 10, 11 can be E2 or E3 or any speed position therebetween.

When the setter switch 68 is operated to its under-load mode position, the current position of the first and second main speed change devices 10 and 11 is set to be the higher speed position limit E3 of the automatic speed change range. Accordingly, the operator can set the automatic speed change range (i.e. the higher speed limit position E3) to any desired position, whether it is a higher or lower speed position, by operating the setter switch 68 to its manual mode position and then shifting the first and second main speed change devices 10 and 11 to a desired speed position by using the shift up button 61 or shift down button 62 and finally by operating the setter switch 68 back to the under-load mode position. Once the limit position E3 on the higher speed position side is set in this manner, the limit speed position on the lower speed position side of the automatic speed change range is set accordingly.

Operation of the auxiliary speed change device 12 by the speed change lever 28 is described next.

By operating the speed change lever 28 to its neutral position N, low speed position L, and high speed position H, the auxiliary speed change device 12 (the shift member 53) is shifted to the neutral position, low, and high speed positions respectively.

For example, while the forward/reverse lever 59 in the forward travel position F (i.e. the forward travel clutch 5 is engaged while the reverse clutch 6 is disengaged) and the speed change lever 28 in its low speed position L (or a high speed position H) (i.e. the speed change lever 28 is held at the low (or high) speed position by the control button 57 and lock pin 56), moving the lock pin 56 out of the guide plate 60 by depressing the control button 57, the electromagnetic control valve 36b moves the switch valve 36a to the draining position to disengage the forward travel clutch 5.

The speed change lever 28 is then operated from the low speed position L (or the high speed position H) to the neutral position N, or to the high speed position H (or the low speed position L) with the control button depressed. The control button 57 is then released to retain the speed change lever 28 at the neutral position N, or at high speed position H (or low speed position L) by means of the lock pin 56.

If the control button 57 is released when the speed change lever 28 is in the neutral position N, the switch valve 36a is moved to the fluid draining position by the electromagnetic control valve 36b to immediately disengage the forward travel clutch 5 by the electromagnetic proportional valve 35. If the control button 57 is released when the speed change lever 28 is in the high speed position H (or the low speed position L), the switch valve 36a is moved to the fluid supplying position by the electromagnetic control valve 36b to gradually engage the forward travel clutch 5 by the electromagnetic proportional valve 35.

If the control button 57 of the speed change lever 28 is depressed and released with the forward/reverse lever 59 in its reverse position R (i.e. the reverse clutch 6 is engaged and the forward travel clutch 5 is disengaged), the reverse clutch 6 is shifted to its disengaged and engaged positions respectively.

Other embodiments of the present invention is described next. It is to be understood that any feature described in any of the embodiment can be applied to any other embodiment unless inconsistency occurs. Such combination of embodiments should be understood to be within the scope of the present invention.

Second Embodiment

As shown in FIG. 13, instead of setting the first set value N16 equal to zero when the sensitivity adjusting switch 76 is operated to the operating range H4, the first set value N16 (shown at A5) in the range H4 may be a simple linear extension of the values of N16 in the range H3 so that, for example, the value reaches zero at the origin on the upper right hand side corner of FIG. 13. This allows for the range for shift to a higher speed position when the sensitivity adjusting switch 76 is in the range H4.

Third Embodiment

In stead of having one sensitivity adjusting switch 76 to set both the first and second set values N16 and N14, two sensitivity adjusting switches may be provided with one dedicated to set and adjust the first set value N16 and the other dedicated to set and adjust the second set value N14 so that the first and second set values N16 and N14 can be set and adjusted independently.

Forth Embodiment

The same control sequence in the under-load mode may be used in the traveling mode.

Fifth Embodiment

It is also possible to arrange the auxiliary change speed device 12 in FIG. 1 so that it has a low speed clutch and a high speed clutch in parallel (similar to the second main speed change device 11) and to provide an electromagnetic proportional valve to each of the high and low speed clutches of the auxiliary change speed device 12. This allows sixteen different speed positions among the first and second main speed change devices 10, 11 and the auxiliary change speed device 12. And the first and second main speed change devices 10, 11 and the auxiliary change speed device 12 can be shifted to any one speed position between the first position to sixteenth position by depressing either the shift up or down button.

Sixth Embodiment

The first and second main speed change devices 10, 11 are of a hydraulic clutch type. However, They can be constructed by gear speed change type with shift members actuated by hydraulic cylinders similar to the auxiliary change speed device 12.

The present invention can be applied to a work vehicle with the first and second main speed change devices 10, 11 having 10 or 6 or any number of speed positions, or with the auxiliary change speed device 12 having three speed positions (high, low, and neutral positions). The invention also can be applied to a work vehicle with the first and second main speed change devices 10, 11 of a hydraulic or belt-driven stepless type.

Seventh Embodiment

The present invention can also be applied to a vehicle with endless tracks.

What is claimed is:

1. A work vehicle having a speed change arrangement comprising:
    ground contact means;
    an engine supported by the ground contact means;
    power train provided between the engine and the ground contact means, the power train transmitting power to the ground contact means;
    a speed change device provided to the power train;
    an accelerator operating member for controlling the accelerator for the engine;
    rotational speed sensing means that senses an actual rotational speed of the engine;
    automatic speed change means for shifting the speed change device to a higher speed position if a difference between a set rotational speed of the engine set by the accelerator operating member and the actual engine rotational speed is less than a first set value, and for shifting the speed change device to a lower speed position if the difference between the set rotational speed of the engine set by the accelerator operating member and the actual engine rotational speed is greater than a second set value which is greater than the first set value;
    adjusting means for changing the first and second set values.

2. A work vehicle according to claim 1, wherein the adjusting means is capable of both decreasing and increasing the first set value while maintaining the value of the second set value.

3. A work vehicle according to claim 1, wherein the adjusting means is capable of decreasing the first and second set values simultaneously and is also capable of increasing the first and second set values simultaneously.

4. A work vehicle according to claim 1, wherein the adjusting means includes a manually operable member.

5. A work vehicle according to claim 4, wherein the first and second set values are changed by the single manually operable member.

6. A work vehicle according to claim 1 further comprising:
    change rate sensing means that senses a change rate of the actual rotational speed of the engine;
    automatic speed lowering means for shifting the speed change device to a lower speed position if the change rate approaches a predetermined change rate and remains at a value close to the predetermined change rate for a predetermined amount of time when the actual engine rotational speed decreases;
    changing means for delaying or expediting the timing for shifting the speed change device to a lower position by the automatic speed lowering means depending on the difference between the actual change rate and the predetermined change rate while the actual change rate is at a value close to the predetermined change rate when the actual engine rotational speed decreases.

7. A work vehicle according to claim 1 further comprising:
    automatic speed increasing means for shifting the speed change device to a higher speed position if the actual rotational speed of the engine increases to approach a predetermined rotational speed and remains at a value close to the predetermined rotational speed for a predetermined amount of time;
    changing means for delaying or expediting the timing for shifting the speed change device to a higher speed position by the automatic speed increasing means depending on the difference between the actual engine rotational speed and the predetermined rotational speed when the actual engine rotations speed increases to a value close to the predetermined rotational speed.

8. A work vehicle having a speed change arrangement comprising:
ground contact means;
an engine supported by the ground contact means;
power train provided between the engine and the ground contact means, the power train transmitting power to the ground contact means;
a speed change device provided to the power train;
change rate sensing means that senses a change rate of the actual rotational speed of the engine;
automatic speed lowering means for shifting the speed change device to a lower speed position if the change rate approaches a predetermined change rate and remains at a value close to the predetermined change rate for a predetermined amount of time when the actual engine rotational speed decreases;
changing means for delaying or expediting the timing for shifting the speed change device to a lower position by the automatic speed lowering means depending on the difference between the actual change rate and the predetermined change rate while the actual change rate is at a value close to the predetermined change rate when the actual engine rotational speed decreases.

9. A work vehicle according to claim 8, wherein
said changing means expedites the timing for shifting the speed change device to a lower position by the automatic speed lowering means if the actual change rate becomes greater than the predetermined change rate while the actual change rate is at a value close to the predetermined change rate when the actual engine rotational speed decreases.

10. A work vehicle according to claim 8 further comprising:
rotational speed sensing means that senses an actual rotational speed of the engine;
an accelerator operating member for controlling the accelerator for the engine;
automatic speed change means for shifting the speed change device to a higher speed position if a difference between a set rotational speed of the engine set by the accelerator operating member and the actual engine rotational speed is less than a first set value, and for shifting the speed change device to a lower speed position if the difference between the set rotational speed of the engine set by the accelerator operating member and the actual engine rotational speed is greater than a second set value which is greater than the first set value;
manually operated adjusting means for changing the first and second set values.

11. A work vehicle having a speed change arrangement comprising:
ground contact means;
an engine supported by the ground contact means;
power train provided between the engine and the ground contact means, the power train transmitting power to the ground contact means;
a speed change device provided to the power train;
rotational speed sensing means that senses an actual rotational speed of the engine;
automatic speed increasing means for shifting the speed change device to a higher speed position if the actual rotational speed of the engine increases to approach a predetermined rotational speed and remains at a value close to the predetermined rotational speed for a predetermined amount of time;
changing means for delaying or expediting the timing for shifting the speed change device to a higher speed position by the automatic speed increasing means depending on the difference between the actual engine rotational speed and the predetermined rotational speed when the actual engine rotations speed increases to a value close to the predetermined rotational speed.

12. A work vehicle according to claim 11, wherein
said changing means expedites the timing for shifting the speed change device to a higher speed position by the automatic speed increasing means if the actual engine rotational speed becomes greater than the predetermined rotational speed when the actual engine rotations speed increases to a value close to the predetermined rotational speed.

13. A work vehicle according to claim 11, wherein
said changing means delays the timing for shifting the speed change device to a higher speed position by the automatic speed increasing means if the actual engine rotational speed becomes less than the predetermined rotational speed when the actual engine rotations speed increases to a value close to the predetermined rotational speed.

14. A work vehicle according to claim 11 further comprising:
rotational speed sensing means that senses an actual rotational speed of the engine;
an accelerator operating member for controlling the accelerator for the engine;
automatic speed change means for shifting the speed change device to a higher speed position if a difference between a set rotational speed of the engine set by the accelerator operating member and the actual engine rotational speed is less than a first set value, and for shifting the speed change device to a lower speed position if the difference between the set rotational speed of the engine set by the accelerator operating member and the actual engine rotational speed is greater than a second set value which is greater than the first set value;
manually operated adjusting means for changing the first and second set values.

15. A work vehicle having a speed change arrangement comprising:
front wheels and rear wheels;
an engine supported by the front wheels and rear wheels;
power train extending between the engine and at least the rear wheels, the power train transmitting power at least to the rear wheels;
a speed change device provided to the power train;
an accelerator operating member for controlling the accelerator for the engine;
a rotational speed sensor that senses an actual rotational speed of the engine;
a controller signally connected to the rotational speed sensor, the controller shifting the speed change device to a higher speed position if a difference between a set rotational speed of the engine set by the accelerator operating member and the actual engine rotational speed is less than a first set value, and the controller shifting the speed change device to a lower speed position if the difference between the set rotational speed of the engine set by the accelerator operating member and the actual engine rotational speed is greater than a second set value which is greater than the first set value;

at least one manual adjusting member for manually changing the first and second values.

16. A work vehicle having a speed change arrangement comprising:

front wheels and rear wheels;

an engine supported by the front wheels and rear wheels;

power train extending between the engine and at least the rear wheels, the power train transmitting power at least to the rear wheels;

a speed change device provided to the power train;

change rate sensor that senses a change rate of the actual rotational speed of the engine;

a controller signally connected to the change rate sensor, the controller shifting the speed change device to a lower speed position if the actual change rate approaches a predetermined change rate and remains at a value close to the predetermined change rate for a predetermined period of time when the actual engine rotational speed decreases and the controller delaying or expediting the timing for shifting the speed change device to a lower position depending on the difference between the actual change rate and the predetermined change rate while the actual change rate is at a value close to the predetermined change rate when the actual engine rotational speed decreases.

17. A work vehicle having a speed change arrangement comprising:

front wheels and rear wheels;

an engine supported by the front wheels and rear wheels;

power train extending between the engine and at least the rear wheels, the power train transmitting power at least to the rear wheels;

a speed change device provided to the power train;

a rotational speed sensor that senses an actual rotational speed of the engine;

a controller signally connected to the rotational speed sensor, the controller shifting the speed change device to a higher speed position if the actual engine rotational speed increases to approach a predetermined rotational speed and remains at a value close to the predetermined rotational speed for a predetermined period of time and the controller delaying or expediting the timing for shifting the speed change device to the higher speed position depending on the difference between the actual engine rotational speed and the predetermined rotational speed while the actual engine rotational speed increases to a value close to the predetermined rotational speed.

* * * * *